(12) United States Patent
Kasperchik et al.

(10) Patent No.: US 11,583,920 B2
(45) Date of Patent: Feb. 21, 2023

(54) THREE-DIMENSIONAL PRINTING

(71) Applicant: HEWLETT-PACKARD DEVELOPMENT COMPANY, L.P., Houston, TX (US)

(72) Inventors: Vladek Kasperchik, Corvallis, OR (US); Mohammed S. Shaarawi, Corvallis, OR (US); James McKinnell, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 839 days.

(21) Appl. No.: 16/077,772

(22) PCT Filed: Oct. 12, 2017

(86) PCT No.: PCT/US2017/056363
§ 371 (c)(1),
(2) Date: Aug. 14, 2018

(87) PCT Pub. No.: WO2018/156207
PCT Pub. Date: Aug. 30, 2018

(65) Prior Publication Data
US 2021/0197280 A1 Jul. 1, 2021

Related U.S. Application Data

(63) Continuation-in-part of application No. PCT/US2017/019298, filed on Feb. 24, 2017.

(51) Int. Cl.
B33Y 70/00 (2020.01)
B33Y 10/00 (2015.01)
(Continued)

(52) U.S. Cl.
CPC .............. B22F 1/10 (2022.01); B22F 1/05 (2022.01); B22F 3/1021 (2013.01); B22F 10/10 (2021.01);
(Continued)

(58) Field of Classification Search
None
See application file for complete search history.

(56) References Cited

U.S. PATENT DOCUMENTS 3,704,275 A 11/1972 Burg et al.
5,340,656 A 8/1994 Sachs
(Continued)

FOREIGN PATENT DOCUMENTS

CN 1163631 A 10/1997
CN 1711223 A 12/2005
(Continued)

OTHER PUBLICATIONS

Evonik Operations GmbH "Substrate wetting additive SURFYNOL® 465" (Year: 2021).*
(Continued)

Primary Examiner — Anthony J Zimmer
Assistant Examiner — Dean Mazzola
(74) Attorney, Agent, or Firm — HP Inc. Patent Department

(57) ABSTRACT

An example of a method, for three-dimensional (3D) printing, includes applying a build material and patterning at least a portion of the build material. The patterning includes selectively applying a wetting amount of a binder fluid on the at least the portion of the build material and subsequently selectively applying a remaining amount of the binder fluid on the at least the portion of the build material. An area density in grams per meter square meter (gsm) of the wetting
(Continued)

amount ranges from about 2 times less to about 30 times less than area density in gsm of the remaining amount.

17 Claims, 6 Drawing Sheets

(51) Int. Cl.
| | |
|---|---|
| *B33Y 30/00* | (2015.01) |
| *B29C 64/165* | (2017.01) |
| *B22F 10/14* | (2021.01) |
| *B22F 1/10* | (2022.01) |
| *B22F 10/10* | (2021.01) |
| *B33Y 70/10* | (2020.01) |
| *B22F 10/50* | (2021.01) |
| *B22F 3/10* | (2006.01) |
| *B29C 64/295* | (2017.01) |
| *B29C 64/209* | (2017.01) |
| *C08L 13/02* | (2006.01) |
| *B22F 1/05* | (2022.01) |
| *C08K 5/053* | (2006.01) |
| *B22F 1/103* | (2022.01) |

(52) U.S. Cl.
CPC ............. *B22F 10/14* (2021.01); *B22F 10/50* (2021.01); *B29C 64/165* (2017.08); *B29C 64/209* (2017.08); *B29C 64/295* (2017.08); *B33Y 10/00* (2014.12); *B33Y 30/00* (2014.12); *B33Y 70/00* (2014.12); *B33Y 70/10* (2020.01); *C08L 13/02* (2013.01); *B22F 1/103* (2022.01); *B22F 2304/10* (2013.01); *C08K 5/053* (2013.01)

(56) References Cited

U.S. PATENT DOCUMENTS

| | | | |
|---|---|---|---|
| 5,387,380 | A | 2/1995 | Cima et al. |
| 6,433,117 | B1 | 8/2002 | Ma et al. |
| 6,508,980 | B1 | 1/2003 | Sachs et al. |
| 6,596,224 | B1 | 7/2003 | Sachs et al. |
| 6,624,225 | B1 | 9/2003 | Ellison et al. |
| 6,746,506 | B2 | 6/2004 | Liu et al. |
| 6,819,906 | B1 | 11/2004 | Herrmann et al. |
| 7,108,733 | B2 | 9/2006 | Enokido |
| 7,141,207 | B2 | 11/2006 | Jandeska et al. |
| 7,220,380 | B2 | 5/2007 | Farr et al. |
| 7,608,646 | B1 | 10/2009 | Ganapathiappan et al. |
| 9,133,344 | B2 | 9/2015 | Ganapathiappan et al. |
| 9,156,999 | B2 | 10/2015 | Ng et al. |
| 9,327,448 | B2 | 5/2016 | Shah et al. |
| 9,550,328 | B2 | 1/2017 | Donaldson |
| 2001/0050031 | A1 | 12/2001 | Bredt et al. |
| 2004/0145088 | A1 | 7/2004 | Patel et al. |
| 2005/0003189 | A1 | 1/2005 | Bredt et al. |
| 2005/0079086 | A1 | 4/2005 | Farr et al. |
| 2005/0191200 | A1 | 9/2005 | Canzona et al. |
| 2006/0045787 | A1 | 3/2006 | Jandeska, Jr. et al. |
| 2006/0071367 | A1* | 4/2006 | Hunter ............... B28B 1/001 264/308 |
| 2006/0240259 | A1 | 10/2006 | Toyoda et al. |
| 2007/0216742 | A1 | 9/2007 | Sarkisian et al. |
| 2008/0277837 | A1 | 11/2008 | Liu et al. |
| 2009/0022615 | A1 | 1/2009 | Entezarian |
| 2012/0092428 | A1 | 4/2012 | Ganapathiappan et al. |
| 2012/0156605 | A1 | 6/2012 | Vanbesien et al. |
| 2012/0274015 | A1 | 11/2012 | Terrero et al. |
| 2013/0085217 | A1 | 4/2013 | Iu et al. |
| 2013/0207333 | A1 | 8/2013 | Brundige et al. |
| 2014/0072777 | A1 | 3/2014 | Boday et al. |
| 2015/0069649 | A1 | 3/2015 | Bai et al. |
| 2015/0125334 | A1 | 5/2015 | Uetani et al. |
| 2015/0166277 | A1 | 6/2015 | Shelhart et al. |
| 2015/0328835 | A1 | 11/2015 | Wu et al. |
| 2016/0040025 | A1 | 2/2016 | Norikane et al. |
| 2016/0083304 | A1 | 3/2016 | Mironets et al. |
| 2016/0158843 | A1 | 6/2016 | Yolton et al. |
| 2016/0325356 | A1 | 11/2016 | Hirata et al. |
| 2017/0028475 | A1 | 2/2017 | Heikkila |
| 2017/0080497 | A1 | 3/2017 | Tuffile et al. |
| 2018/0298222 | A1 | 10/2018 | Zhang et al. |

FOREIGN PATENT DOCUMENTS

| | | |
|---|---|---|
| CN | 1812878 A | 8/2006 |
| CN | 101010161 A | 8/2007 |
| CN | 101068503 A | 11/2007 |
| CN | 101264517 A | 9/2008 |
| CN | 101489704 A | 7/2009 |
| CN | 101646402 A | 2/2010 |
| CN | 102884145 A | 1/2013 |
| CN | 103419270 A | 12/2013 |
| CN | 103534099 A | 1/2014 |
| CN | 103702811 A | 4/2014 |
| CN | 204018721 U | 12/2014 |
| CN | 105057664 A | 11/2015 |
| CN | 105364065 A | 3/2016 |
| CN | 105658416 A | 6/2016 |
| CN | 106255582 A | 12/2016 |
| CN | 106363170 A | 2/2017 |
| DE | 10021490 A1 | 11/2001 |
| DE | 112004000682 T5 | 4/2006 |
| EP | 1841381 B1 | 3/2013 |
| EP | 3117982 | 1/2017 |
| JP | 07-507508 A | 8/1995 |
| JP | 2004306557 A | 11/2004 |
| JP | 5334233 B2 | 11/2013 |
| JP | 2014522331 | 9/2014 |
| JP | 2015528032 | 9/2015 |
| JP | 2016037041 A | 3/2016 |
| JP | 2016040121 A | 3/2016 |
| JP | 2016-525993 A | 9/2016 |
| JP | 2016179638 A | 10/2016 |
| JP | 2016221682 A | 12/2016 |
| KR | 1020160091329 | 8/2016 |
| RU | 2535704 C1 | 12/2014 |
| WO | WO02064471 A1 | 8/2002 |
| WO | WO2007039450 A1 | 4/2007 |
| WO | WO-2007039450 A1 | 4/2007 |
| WO | 2009/139393 A1 | 11/2009 |
| WO | WO-2015171182 | 11/2015 |
| WO | WO2016053305 A1 | 4/2016 |
| WO | 2016/068899 A1 | 5/2016 |
| WO | WO-201 6072076 | 5/2016 |
| WO | 2016/175817 A1 | 11/2016 |
| WO | WO2017014784 A1 | 1/2017 |
| WO | WO-201 7018984 | 2/2017 |
| WO | WO201 7018984 A1 | 2/2017 |
| WO | 2017/112628 A1 | 6/2017 |

OTHER PUBLICATIONS

Bai, Yun, and Christopher B. Williams. "An exploration of binder jetting of copper." Rapid Prototyping Journal 21.2 (2015): 177-185.
JlaTeKCM CHHTenIIIeCKIie Xnmitilecxast 31-111,11KROIIea1151. TOM 2, MOCKBa COBeTCKafi municionemie 1990, 1150-1151, non-official translation (Synthetic Latexes. Chemical Encyclopedia.).
Kabahob B.A. 3HUHICIIMICAFIR nonnmepon. 143):taTeJlbCTBO COBeTCKa5f 3numcnonemte, 1974, 40-42, 664-678, non-official translation (Kabanov V.A. Encyclopedia of polymers).
Unknown, "Introducing Bldrmetal™ Powders for Binder Jet 3D Printing", Sep. 24, 2015, 4 pages, NanoSteel.
"Kinetics of emulsion polymerization of styrene using reactive surfactant HITENOL BC20"—Journal of Applied Polymer Science, vol. 109, No. 4.
Jakus, Adam E., et al. Abstract from "Metallic architectures from 3D printed powderbased liquid inks" Advanced Functional Materials 25.45 (2015), 3 pages.

(56) References Cited

OTHER PUBLICATIONS

Kabanov, V.A.,"Encyclopedia of Polymers", L-PolynosiC fibers, Publishing: "Sovetskaya Entsiklodedia", (1990), 17 pages.
Tatar, Kenneth, ASM Handbook, V.05B-Protective Organic Coatings, 6.4 Film Formation of Acrylic Latex Polymers, 2015, 15 pages.
"Latexes", Chapter 3, 2017, 16 pages.
Espacenet Machine translation of WO2009/139393 retrieved on Feb. 2, 2021 (Year: 2009).
Huang Hengqian. Progress in the World Chemical Industry, May 1984, pp. 266-271, Ministry of Chemical Industry,Beijing, China.
James et al., "Powder Metallurgy Methods and Applications", ASM, 2015, 11 pages.
Li Luhai et al., Coating Compounding Technique,Jul. 2001, p. 363-365, Printing Industry Press, Beijing, China.
Procopio et al., "Acrylic Coatings", ASM International, 2015, 15 pages.
Samal, Prasan et al., "Powder Metallurgy Methods and Applications" 2015, ASM Handbook V.07-Powder Metallurgy.
Shen Xiaoping, Powder Metallurgy Manufacturing Engineering,Jun. 2015, pp. 130-133,National Defence Industry Press, Beijing, China.
Utela Ben et al: "Development Process for Custom Three-Dimensional Printing (3DP) Material Systems", Journal of Manufacturing Science and Engineering, ASME International, New York, NY, US, vol. 132, No. 1, Feb. 1, 2010 (Feb. 1, 2010), pp. 11008-1, XP009520366.
Wang Jiangu et al. Multicomponent Polymers: Principle, Structure and Properties,Oct. 31, 2013, p. 7 and p. 178-179, Tongji University Press,Shanghai, China.
Jianzhong, M., "Synthesis Principle and Application Technology of Leather Chemicals," Aug. 2009, China Light Industry Press, pp. 1-10.

* cited by examiner

THREE-DIMENSIONAL PRINTING

CROSS-REFERENCE TO RELATED APPLICATIONS

The present application claims priority to International Application Serial No. PCT/US2017/019298, filed Feb. 24, 2017, the contents of which is hereby incorporated by reference.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing or fusing or melting of the build material. For some materials, at least partial melting may be accomplished using heat-assisted extrusion, and for some other materials (e.g., polymerizable materials), curing or fusing may be accomplished using, for example, ultraviolet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
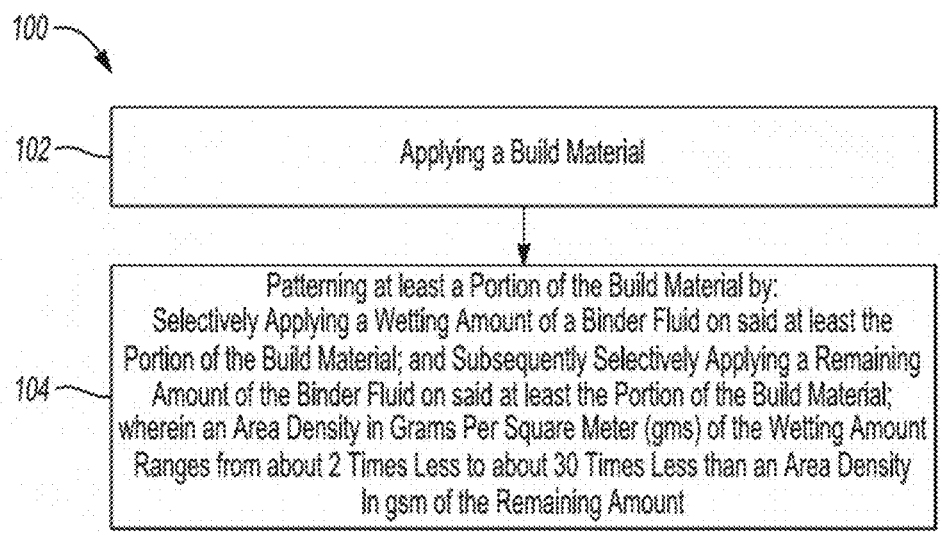
FIG. 1 is a flow diagram illustrating an example of a 3D printing method disclosed herein.

In the examples disclosed herein, a binder fluid is utilized to pattern each build material layer during three-dimensional (3D) printing. In some examples, the binder fluid includes a binder that is capable of being activated to hold the build material particles together in the patterned area. In other examples, the binder fluid includes an active material that is capable of absorbing radiation and converting the absorbed radiation to thermal energy, which in turn fuses the build material in the patterned area.

In 3D printing, enough of the binder fluid should be applied in order to fill a significant part of the void space inside the build material layer. This ensures that enough of the binder or active material is put into contact with enough of the build material particles in order to achieve the desired effect (e.g., binding, fusing) between the binder and/or active material and the build material particles. As an example, for a build material layer with a packing density ranging from about 30 vol % to about 60 vol % (i.e., the voids make up from about 40 vol % to about 70 vol %), it is desirable that at least about 50 vol % or at least about 60 vol % of the void space (in the patterned portion) be filled with binder fluid. The weight of the binder fluid that is applied to fill the desired percentage of void space depends upon the density of the binder fluid.

In an example, the binder fluid includes water and a binder that is soluble in water, and thus has a density of about 1.0 g/cm$^3$. In this example, about 20 gsm (grams per square meter) of the 1.0 g/cm$^3$ binder fluid would fill 50 vol % of the void space in a patterned portion of a 100 μm thick build material layer containing 40 vol % void space (i.e., 40% vol voids*50%=20% filled with 1 g/cm$^3$). In this same example, about 42 gsm of the 1.0 g/cm$^3$ binder fluid would fill 60 vol % of the void space in a patterned portion of a 100 μm thick build material layer containing 70 vol % void space (i.e., 70% vol voids' 60%=42% filled with 1 g/cm$^3$). In this example, the binder fluid having a density of about 1.0 g/cm$^3$ may be applied at a fluid flux density (i.e., area density in gsm) ranging from about 20 grams per square meter (gsm) to about 42 gsm in order to fill the significant part of the void space.

In another example, the binder fluid includes water and carbon active material that makes up about 10% solids of the binder fluid, and thus has a density of about 1.2 g/cm$^3$. In this example, about 24 gsm of the 1.2 g/cm$^3$ binder fluid would fill 50 vol % of the void space in a patterned portion of a 100 μm thick build material layer containing 40 vol % void space (i.e., 40% vol voids*50%=20% filled with 1.2 g/cm$^3$). In this same example, about 50 gsm of the 1.2 g/cm$^3$ binder fluid would fill 60 vol % of the void space in a patterned portion of a 100 μm thick build material layer containing 70 vol % void space (i.e., 70% vol voids*60%=42% filled with 1.2 g/cm). In this example, the binder fluid having a density of about 1.2 g/cm$^3$ may be applied at a fluid flux density (i.e., area density in gsm) ranging from about 24 grams per square meter (gsm) to about 50 gsm in order to fill the significant part of the void space.

The present inventors have found that when a large amount of binder fluid (e.g., an amount sufficient to fill a significant part of the void space) is applied on dry build material powder, the binder fluid may initially form a puddle on the surface of the powder. Puddle formation may be due, in part, to binder fluid penetration being slower than its application. In other words, the delayed penetration of the binder fluid into the available porosity can result in puddling. Puddle formation may occur when the volume of fluid divided by the volume of porosity available at the surface of the powder layer is greater than or equal to 1. The surface tension of the binder fluid may cause the puddle to shift or bead, which may also shift or displace the build material particles. The applied binder fluid ultimately penetrates into the build material layer, leaving behind the displaced build material particles. Penetration may vary depending upon the build material used. For example, with metal build materials and some polymeric and ceramic build materials, penetration of the binder fluid may mean that the fluid at least partially fills the void spaces between the build material particles. In these examples, the build materials do not absorb into the build material particles. For another example, with some polymeric and/or ceramic build materials, penetration of the binder fluid may mean that the fluid at least partially fills the void spaces between the build material particles and may partially absorb into the build material particles. The displaced powder may affect the precision and quality of the 3D part that is formed. For example, the displaced build material powder may lead to 3D parts having imprecise shapes, varying structural properties, structural defects and/or varying visual qualities.

The present inventors have also found that the multi-application patterning methods disclosed herein may be used to fill the desired void space without substantially disrupting the surface topography of the build material layer being patterned. In the examples disclosed herein, the build material is patterned with the binder fluid by selectively applying a wetting amount that is lower than a subsequently applied remaining amount of the binder fluid, and subsequently applying the remaining amount. The wetting amount may be sufficient to wet and at least partially penetrate the build material particles to which it is applied, and insufficient to form a puddle on the surface of the build material particles. The wetting amount is small enough so that fluid penetration can occur without an excess of fluid building up at the surface. Because the wetting amount can readily penetrate into the build material layer, the wetting amount does not puddle and thus does not displace the build material. The wetting amount may also lock the wetted build material particles into place through liquid bridges and capillary forces, which prevents the displacement of the build material particles when the remaining amount is applied. The remaining amount may be sufficient to penetrate the layer of the build material particles without displacing the build material particles. The remaining amount, in combination with the wetting amount, may also be sufficient to form a mechanically strong intermediate part layer when the binder fluid includes the binder or a mechanically strong fused layer when the binder fluid includes the active material. In the examples disclosed herein, it has been found that when the area density in gsm of the wetting amount ranges from about 2 times to about 30 times less than the area density in gsm of the remaining amount, the previously described results can be achieved. For a 100 μm thick build material layer, examples of the wetting amount may range from about 1.5 gsm to about 8.5 gsm, and examples of the remaining amount may range from about 12 gsm to about 42 gsm. For a 500 μm to 600 μm thick build material layer, examples of the wetting amount may range from about 1.5 gsm to about 8.5 gsm, and examples of the remaining amount may range from about 12 gsm to about 252 gsm.

Referring now to FIG. 1, an example of the 3D printing method 100 is depicted. One example of the three-dimensional (3D) printing method 100 comprises: applying a build material (reference numeral 102); and patterning at least a portion of the build material by: selectively applying a wetting amount of a binder fluid on the at least the portion of the build material; and subsequently selectively applying a remaining amount of the binder fluid on the at least the portion of the build material; wherein an area density in grams per square meter (gsm) of the wetting amount ranges from about 2 times less to about 30 times less than an area density in gsm of the remaining amount (reference numeral 104).

Figure 2:
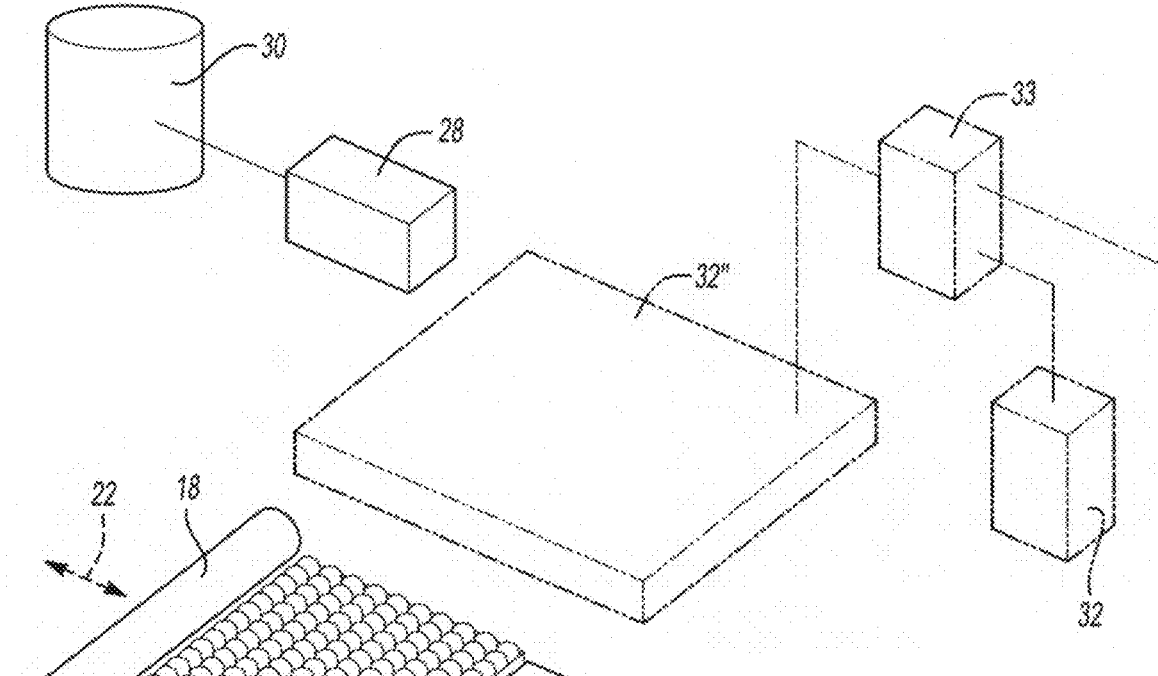
FIG. 2 is a simplified isometric and schematic view of an example of a 3D printing system disclosed herein.

As shown at reference numeral 102, the method 100 includes applying the build material 16 (see, e.g., FIG. 2). The build material 16 may be a metallic build material 16, a ceramic build material 16, a polymeric build material 16, or a combination thereof. In an example, the build material may be a powder.

The metallic build material 16 may be any particulate metallic material. When the build material 16 is the metallic build material 16, the binder fluid 36 (see, e.g., FIG. 3C) may include the binder and may be used to create a patterned intermediate part 42 (see, e.g., FIG. 3F) and then a cured intermediate part 42' (see, e.g., FIG. 3F) from the metallic build material 16. In these examples, the cured intermediate part 42', once extracted from the build material 16 that was not patterned with the binder fluid 36, may undergo de-binding to produce the at least substantially binder-free part 48 (see, e.g., FIG. 3G), and the at least substantially binder-free part 48 may then undergo sintering to form the final 3D printed part 50 (see, e.g., FIG. 3G). It is noted that the terms patterned intermediate part, cured intermediate part, and substantially binder-free part are defined below in reference to FIGS. 3A-3G.

In an example, the metallic build material 16 may have the ability to sinter into a continuous body to form the 3D part 50 when heated to the sintering temperature (e.g., a temperature ranging from about 580° C. to about 1400° C.). By "continuous body," it is meant that the metallic build material particles 16 are merged together to form a single part with sufficient mechanical strength to meet the requirements of the desired final 3D part 50.

While an example sintering temperature range is provided, it is to be understood that this temperature may vary, depending, in part, upon the composition and phase(s) of the metallic build material 16.

In an example, the metallic build material 16 is a single phase metallic material composed of one element. In this example, the sintering temperature may be below the melting point of the single element.

In another example, the metallic build material 16 is composed of two or more elements, which may be in the form of a single phase metallic alloy or a multiple phase metallic alloy. In these other examples, melting generally occurs over a range of temperatures. For some single phase metallic alloys, melting begins just above the solidus temperature (where melting is initiated) and is not complete until the liquidus temperature (temperature at which all the solid has melted) is exceeded. For other single phase metallic alloys, melting begins just above the peritectic temperature. The peritectic temperature is defined by the point where a single phase solid transforms into a two phase solid plus liquid mixture, where the solid above the peritectic temperature is of a different phase than the solid below the peritectic temperature. When the metallic build material 16 is composed of two or more phases (e.g., a multiphase alloy made of two or more elements), melting generally begins when the eutectic or peritectic temperature is exceeded. The eutectic temperature is defined by the temperature at which a single phase liquid completely solidifies into a two phase solid. Generally, melting of the single phase metallic alloy or the multiple phase metallic alloy begins just above the solidus, eutectic, or peritectic temperature and is not complete until the liquidus temperature is exceeded. In some examples, sintering can occur below the solidus temperature, the peritectic temperature, or the eutectic temperature. In other examples, sintering occurs above the solidus temperature, the peritectic temperature, or the eutectic temperature. Sintering above the solidus temperature is known as super solidus sintering, and this technique may be desirable when using larger build material particles 16 and/or to achieve high density. In an example, the build material composition may be selected so that at least 40 vol % of the metallic build material 16 is made up of phase(s) that have a melting point above the desired sintering temperature. It is to be understood that the sintering temperature may be high enough to provide sufficient energy to allow atom mobility between adjacent particles.

Single elements or alloys may be used as the metallic build material 16. Some examples of the metallic build material 16 include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, Ti6Al4V, and Ti-6Al-4V ELI7. While several example alloys have been provided, it is to be understood that other alloy build materials may be used.

Any metallic build material 16 may be used that is in powder form at the outset of the 3D printing method(s) disclosed herein. As such, the melting point, solidus temperature, eutectic temperature, and/or peritectic temperature of the metallic build material 16 may be above the temperature of the environment in which the patterning portion of the 3D printing method 100 is performed (e.g., above 40° C.). In some examples, the metallic build material 16 may have a melting point ranging from about 580° C. to about 3500° C. In other examples, the metallic build material 16 may be an alloy having a range of melting points.

The ceramic build material 16 may be any ceramic particles. When the build material 16 is the ceramic build material 16, the binder fluid 36 may include the binder and may be used to create the patterned intermediate part 42 and then the cured intermediate part 42' from the ceramic build material particles 16. In these examples, the cured intermediate part 42', once extracted from the build material 16 that was not patterned with the binder fluid 36, may undergo de-binding to produce the at least substantially binder-free part 48, and the at least substantially binder-free part 48 may then undergo sintering to form the final 3D printed part 50.

Examples of suitable ceramic particles include metal oxides, inorganic glasses, carbides, nitrides, and borides. Some specific examples include alumina ($Al_2O_3$), glass, $Na_2O/CaO/SiO_2$ glass (soda-lime glass), borosilicate glass, alumina silica glass, silicon mononitride (SiN), silicon dioxide ($SiO_2$), zirconia ($ZrO_2$), titanium dioxide ($TiO_2$), $MgAl_2O_4$, tin oxide, yttrium oxide, hafnium oxide, tantalum oxide, scandium oxide, niobium oxide, vanadium oxide, or combinations thereof. As an example of one suitable combination, 30 wt % glass may be mixed with 70 wt % alumina.

The ceramic build material 16 may have a melting point ranging from about 1000° C. to about 4000° C. As an example, the ceramic build material 16 may be a metal oxide having a melting point ranging from about 1000° C. to about 2800° C.

The polymeric build material particles 16 may be any polymeric build material. When the build material 16 is the polymeric build material 16, the binder fluid 36 may include the active material to absorb radiation 52 and fuse the patterned portion 38 of the polymeric build material 16 to form a fused layer 54 (see, e.g., FIGS. 4D and 4E). In these examples, layers of the polymeric build material 16 can then be repeatedly applied, patterned with the binder fluid 36, and exposed to radiation 52 to iteratively build up the final 3D printed part 50.

As used herein, the term "polymeric build material" may refer to crystalline or semi-crystalline polymer particles. Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the polymeric build material particles 16 include polyethylene, polypropylene, and polyoxomethylene (i.e., polyacetals). Still other examples of suitable polymeric build material particles 16 include polystyrene, polycarbonate, polyester, polyurethanes, other engineering plastics, and blends of any two or more of the polymers listed herein.

The polymeric build material particles 16 may have a melting point or softening point ranging from about 50° C. to about 400° C. As examples, the polymeric build material particles 16 may be a polyamide having a melting point of about 180° C., or a polyurethane having a melting point ranging from about 100° C. to about 165° C.

In some examples, the polymeric build material 16 includes, in addition to polymeric particles, an antioxidant, a brightener, a charging agent, a flow aid, or combinations thereof.

Antioxidant(s) may be added to the polymeric build material 16 to prevent or slow molecular weight decreases of the polymeric build material 16 and/or may prevent or slow discoloration (e.g., yellowing) of the polymeric build material 16 by preventing or slowing oxidation of the polymeric build material 16. In some examples, the antioxidant may be a radical scavenger. In these examples, the antioxidant may include IRGANOX®1098 (benzenepropanamide, N,N'-1,6-hexanediylbis(3,5-bis(1,1-dimethylethyl)-4-hydroxy)), IRGANOX254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). In an example, the antioxidant may be included in the polymeric build material 16 in an amount ranging from about 0.01 wt % to about 5 wt % based on the total weight of the polymeric build material 16.

Brightener(s) may be added to the polymeric build material 16 to improve visibility. Examples of suitable brighteners include titanium dioxide ($TiO_2$), zinc oxide (ZnO), calcium carbonate ($CaCO_3$), zirconium dioxide ($ZrO_2$), aluminum oxide ($A_2O_3$), silicon dioxide ($SiO_2$), and combinations thereof. In some examples, a stilbene derivative may be used as the brightener. In these examples, the temperature(s) of the 3D printing process may be below a threshold temperature above which the stilbene derivative may become unstable. In an example, the brightener may be included in the polymeric build material 16 in an amount ranging from about 0.01 wt % to about 10 wt % based on the total weight of the polymeric build material 16.

Charging agent(s) may be added to the polymeric build material 16 to suppress tribo-charging. Examples of suitable charging agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total weight of the polymeric build material 16.

Flow aid(s) may be added to improve the coating flowability of the polymeric build material 16. Flow aids may be particularly beneficial when the particles of the polymeric build material 16 are less than 25 μm in size. The flow aid improves the flowability of the polymeric build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total weight of the polymeric build material 16.

A combination of any two or more of the previously listed metallic build materials 16, ceramic build materials 16, and/or polymeric build materials 16 may form a composite build material 16. In an example, the ceramic build material 16 and the polymeric build material 16 may be combined to form the composite build material 16. In this example, the amount of ceramic particles that may be combined with the crystalline or semi-crystalline polymer particles may depend on the materials used and the 3D part 50 to be formed. In one example, the ceramic particles may be present in an amount ranging from about 1 wt % to about 20 wt % based on the total weight of the composite build material particles 16.

In some examples, when the build material 16 is a composite build material 16 of multiple metallic build materials and/or ceramic build materials, the binder fluid 36 may include the binder. In other examples, when composite build material 16 includes a bulk of polymeric build material, the binder fluid 36 may include the active material.

The build material particles 16 may be made up of similarly sized particles or differently sized particles. In the examples shown herein (FIG. 2, FIGS. 3A-3G, and FIGS. 4A-4F), the build material 16 includes similarly sized particles. The term "size", as used herein with regard to the build material particles 16, refers to the diameter of a spherical particle, or the average diameter of a non-spherical particle (i.e., the average of multiple diameters across the particle), or the volume-weighted mean diameter of a particle distribution. In an example, the average size of the build material particles 16 ranges from about 1 μm to about 200 μm. In another example, the average size of the build material particles 16 ranges from about 10 μm to about 150 μm. In still another example, the average size of the build material particles 16 ranges from 20 μm to about 90 μm. In yet another example, the average size of the build material particles 16 is about 60 μm.

In some examples, applying the build material 16 may be accomplished with the use of a 3D printing system 10. Referring briefly to FIG. 2, the printing system 10 includes a build area platform 12, the build material supply 14 containing build material particles 16, and the build material distributor 18. It is to be understood that the 3D printing system 10 may include additional components (some of which are described herein) and that some of the components described herein may be removed and/or modified. Furthermore, components of the 3D printing system 10 depicted in FIG. 2 may not be drawn to scale and thus, the 3D printing system 10 may have a different size and/or configuration other than as shown therein The build area platform 12 receives the build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

The build area platform 12 may be moved in a direction as denoted by the arrow 20, e.g., along the z-axis, so that the build material 16 may be delivered to the platform 12, to a previously patterned layer of the patterned intermediate part 42, or to a previously formed layer 54 of the 3D part 50. In an example, when the build material particles 16 are to be delivered, the build area platform 12 may be programmed to advance (e.g., downward) enough so that the build material distributor 18 can push the build material particles 16 onto the platform 12 to form a substantially uniform layer 34 of the build material 16 thereon (see, e.g., FIGS. 3A and 3B and FIGS. 4A and 4B). The build area platform 12 may also be returned to its original position, for example, when a new part is to be built.

The build material supply 14 may be a container, bed, or other surface that is to position the build material particles 16 between the build material distributor 18 and the build area platform 12. In some examples, the build material supply 14 may include a surface upon which the build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material particles 16 from a storage location to a position to be spread onto the build area platform 12, onto a previously patterned layer of the patterned intermediate part 42, or onto a previously formed layer 54 of the 3D part 50.

The build material distributor 18 may be moved in a direction as denoted by the arrow 22, e.g., along the y-axis, over the build material supply 14 and across the build area platform 12 to spread a layer 34 of the build material 16 over the build area platform 12. The build material distributor 18 may also be returned to a position adjacent to the build material supply 14 following the spreading of the build material particles 16. The build material distributor 18 may be a blade (e.g., a doctor blade), a roller, a combination of a roller and a blade, and/or any other device capable of spreading the build material 16 over the build area platform 12. For instance, the build material distributor 18 may be a counter-rotating roller.

Figure 3A:
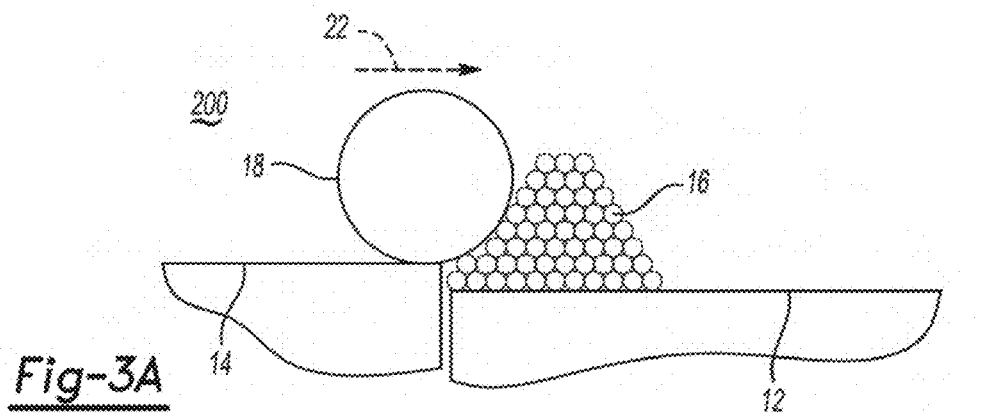
FIGS. 3A through 3G are schematic and partially cross-sectional views depicting the formation of a 3D part using an example of a 3D printing method disclosed herein.
Figure 3B:
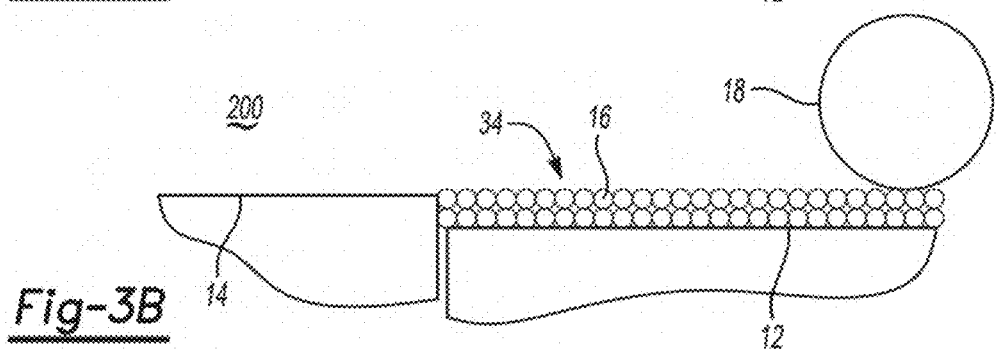
Figure 4A:
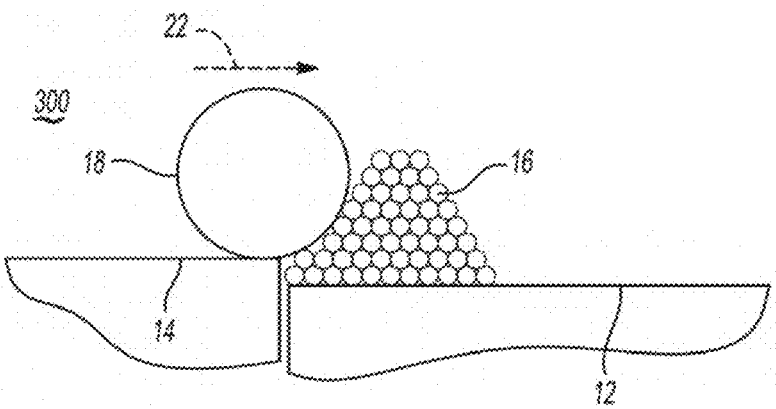
FIGS. 4A through 4F are schematic and partially cross-sectional views depicting the formation of a 3D part using another example of a 3D printing method disclosed herein.
Figure 4B:
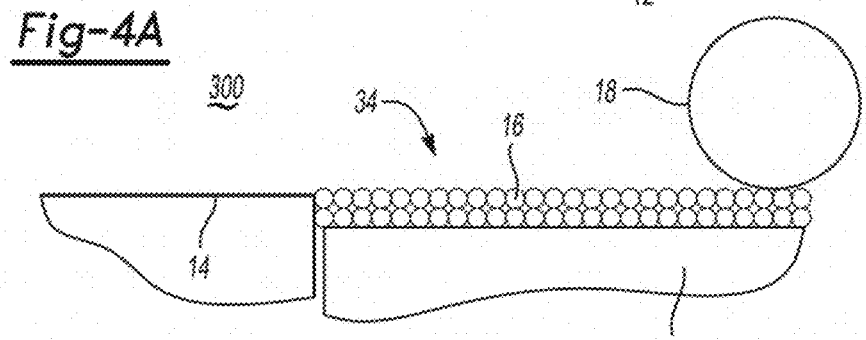

Referring briefly to FIGS. 3A and 3B and FIGS. 4A and 4B, a layer 34 of build material 16 is applied using the system 10. In FIGS. 3A and 4A, the build material supply 14 may supply the build material particles 16 into a position so that they are ready to be spread onto the build area platform 12. In FIGS. 3B and 4B, the build material distributor 18 may spread the supplied build material particles 16 onto the build area platform 12. As shown in FIGS. 3B and 4B, one layer 34 of the build material particles 16 has been applied.

The layer 34 has a substantially uniform thickness across the build area platform 12. In an example, the thickness of the layer 34 is about 100 µm. In another example, the thickness of the layer 34 ranges from about 50 µm to about 300 µm, although thinner or thicker layers may also be used. For example, the thickness of the layer 34 may range from about 20 µm to about 500 µm, or from about 30 µm to about 300 µm. The layer thickness may be about 2× (i.e., 2 times) the particle diameter (as shown in FIGS. 3B and 4B) at a minimum for finer part definition. In some examples, the layer thickness may be about 1.2× the particle diameter.

The thickness of the layer 34 may affect the degree to which the build material particles 16 may be displaced when a large amount of fluid (e.g., an amount sufficient to fill a significant part of the void space) is deposited on dry build material 16 in a single application. In an example, a layer with a thickness greater than or equal to about 100 µm may result in more displacement of the build material particles 16 when a large amount of fluid is applied on the dry particles 16 than would result with a thinner layer. This may be due, in part, to the fact that, with thicker layers, more fluid is applied while the available porosity at the surface of the build material layer remains the same. In an example of the method 100, the build material 16 is applied to form a layer 34 having a thickness greater than or equal to about 100 µm.

Referring back to FIG. 1 and as shown at reference numeral 104, the method 100 includes patterning at least a portion 38 of the build material 16. Patterning is performed based on a 3D object model of the 3D object/part to be generated. Patterning the at least a portion 38 includes selectively applying the wetting amount of the binder fluid 36 on the at least the portion 38 of the build material 16; and subsequently selectively applying the remaining amount of the binder fluid 36 on the at least the portion 38 of the build material 16; wherein the area density in gsm of the wetting amount ranges from about 2 times less to about 30 times less than the area density in gsm of the remaining amount. In another example, the area density in gsm of the wetting amount ranges from about 2 times less to about 10 times less than the area density in gsm of the remaining amount. In another example, the area density in gsm of the wetting amount ranges from about 5 times less to about 15 times less than the area density in gsm of the remaining amount.

As mentioned above, the binder fluid 36 may include the binder or the active material. In some examples, low surface tension of the binder fluid 36 may facilitate penetration of the binder fluid 36 into the layer 34, which may affect the wetting amount and/or the remaining amount and/or how these amounts are applied. For example, allow surface tension may allow larger amounts of the binder fluid 36 to be applied in fewer print passes without displacing the at least the portion 38 of the build material 16. In an example, the binder fluid 36 has a surface tension less than or equal to about 40 dyn/cm.

In an example, the low surface tension (e.g., a surface tension less than or equal to about 40 dyn/cm) of the binder fluid 36 may be achieved by including a surfactant in a liquid vehicle of the binder fluid 36. In some examples of the method 100, the binder fluid 36 includes: the binder or the active material, and the liquid vehicle; the liquid vehicle includes a surfactant; and the binder fluid 36 has a surface tension less than or equal to about 40 dyn/cm. The composition of the binder fluid 36 will be discussed further below in reference to FIGS. 3A-3G and FIGS. 4A-4F.

In an example of the method 100, the wetting amount is sufficient to wet the at least the portion 38 of the build material 16 and is insufficient to form a puddle on a surface of the at least the portion 38 of the build material 16; and the remaining amount is sufficient to penetrate the at least the portion 38 of the build material 16 without displacing the at least the portion 38 of the build material 16.

Because the wetting amount is insufficient to form a puddle on the surface of the build material 16, the wetting amount does not displace the build material 16. The wetting amount, through capillary forces, may also prevent the displacement of the build material particles 16 when the remaining amount is applied.

The wetting amount may depend, in part, on: whether the layer 34 to which it is to be applied is the first (i.e., bottom-most) layer, the thickness of the layer 34 to which it is to be applied, the composition of the build material 16, the average size of the build material particles 16, the composition of the binder fluid 36, the surface tension of the binder fluid 36, the temperature of the build material 16, or a combination thereof. In an example, the wetting amount may range from about 1.5 gsm to about 8.5 gsm. In another example, the wetting amount may range from about 1.5 gsm to about 6 gsm. In yet another example, the wetting amount may range from about 2 gsm to about 5 gsm. In still another example, the wetting amount may be about 4.74 gsm.

As mentioned above, the remaining amount may be sufficient to penetrate the layer 34 of the build material particles 16 without displacing the build material particles 16. In some examples when the binder fluid 36 includes the binder, the remaining amount may also be sufficient to, in combination with the wetting amount, form (after activation of the binder through reaching an activation temperature or evaporation of a liquid vehicle of the binder fluid 36) a mechanically strong layer of the cured intermediate part 42'. In other examples when the binder fluid 36 includes the active material, the remaining amount may also be sufficient to, in combination with the wetting amount, form (after exposure to radiation 52) a mechanically strong fused layer 54.

The remaining amount may depend, in part, on: the wetting amount, the thickness of the layer to which it is to be applied, the composition of the build material 16, the average size of the build material particles 16, the composition of the binder fluid 36, the temperature of the build material 16, or a combination thereof. In an example, the area density in gsm of the remaining amount ranges from about 2 times more to about 30 times more than the area density in gsm of the wetting amount. In an example with a 100 µm thick build material layer, the remaining amount may range from about 12 gsm to about 45 gsm. In another example with a 100 µm thick build material layer, the remaining amount may range from about 18.5 gsm to about 34 gsm. In another example with a 100 µm thick build material layer, the remaining amount may be about 33.2 gsm. In an example with a 200 µm thick build material layer, the remaining amount may range from about 37 gsm to about 68 gsm. In an example with a 500 µm thick build material layer, the remaining amount may range from about 45 gsm to about 75 gsm. In an example with a 500 µm thick build material layer, the remaining amount may range from about 75 gsm to about 252 gsm.

As mentioned above, patterning the build material 16 may be accomplished with the use of the 3D printing system 10. Referring again to FIG. 2, the printing system 10 also includes an inkjet applicator 24, which may contain the binder fluid 36.

The inkjet applicator 24 may be scanned across the build area platform 12 in the direction indicated by the arrow 26, e.g., along the y-axis. The inkjet applicator 24 may be, for instance, a thermal inkjet printhead, a piezoelectric printhead, a continuous inkjet printhead, etc., and may extend a width of the build area platform 12. While the inkjet applicator 24 is shown in FIG. 2 as a single inkjet applicator, it is to be understood that the inkjet applicator 24 may include multiple inkjet applicators that span the width of the build area platform 12. Additionally, the inkjet applicators 24 may be positioned in multiple printbars. The inkjet applicator 24 may also be scanned along the x-axis, for instance, in configurations in which the inkjet applicator 24 does not span the width of the build area platform 12 to enable the inkjet applicator 24 to sequentially deposit the wetting amount of the binder fluid 36 and the remaining amount of the binder fluid 36 over a large area of a layer 34 of build material particles 16. The inkjet applicator 24 may thus be attached to a moving XY stage or a translational carriage (neither of which is shown) that moves the inkjet applicator 24 adjacent to the build area platform 12 in order to deposit the wetting amount and the remaining amount (sequentially) in predetermined areas of a layer 34 of the build material particles 16 that has been formed on the build area platform 12 in accordance with the method 100 disclosed herein. The inkjet applicator 24 may include a plurality of nozzles (not shown) through which the wetting amount and the remaining amount are to be sequentially ejected.

The inkjet applicator 24 may deliver drops of the binder fluid 36 at a resolution ranging from about 300 dots per inch (DPI) to about 1200 DPI. In other examples, the inkjet applicator 24 may deliver drops of the binder fluids 36 at a higher or lower resolution. The drop velocity may range from about 5 m/s to about 24 m/s and the firing frequency may range from about 1 kHz to about 100 kHz. In one example, the volume of each drop may be in the order of about 3 picoliters (pl) to about 18 pl, although it is contemplated that a higher or lower drop volume may be used. In some examples, the inkjet applicator 24 is able to deliver variable drop volumes of the binder fluid 36. One example of a suitable printhead has 600 DPI resolution and can deliver drop volumes ranging from about 6 pl to about 14 pl.

Figure 3C:
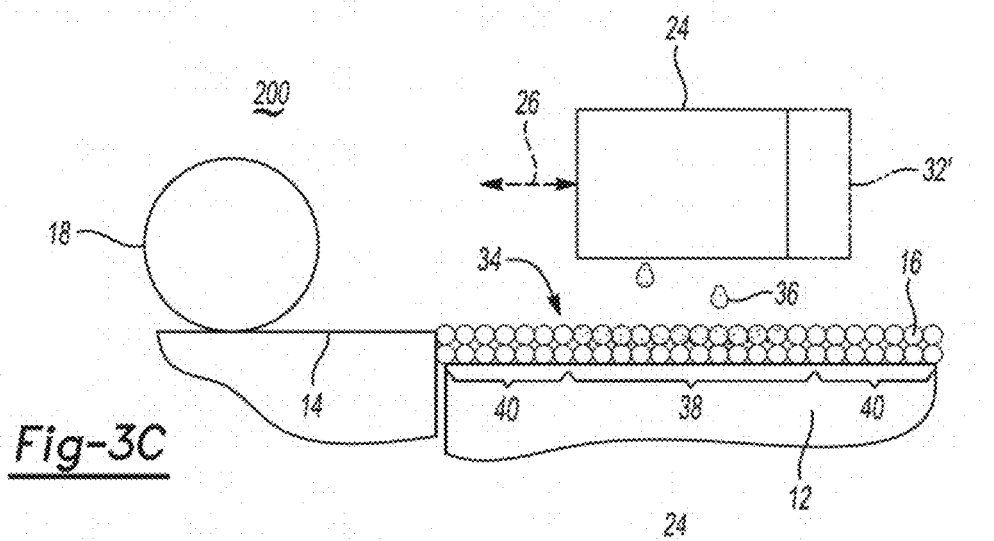
Figure 3D:
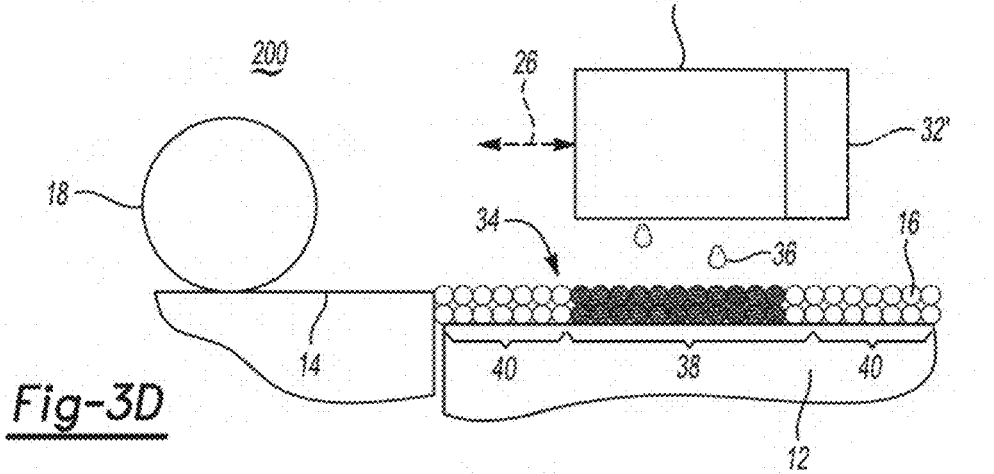
Figure 4C:
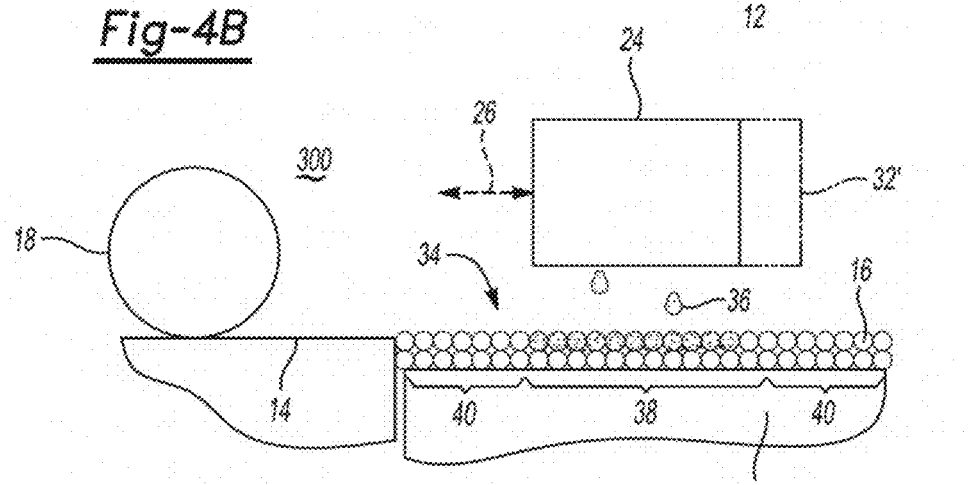
Figure 4D:
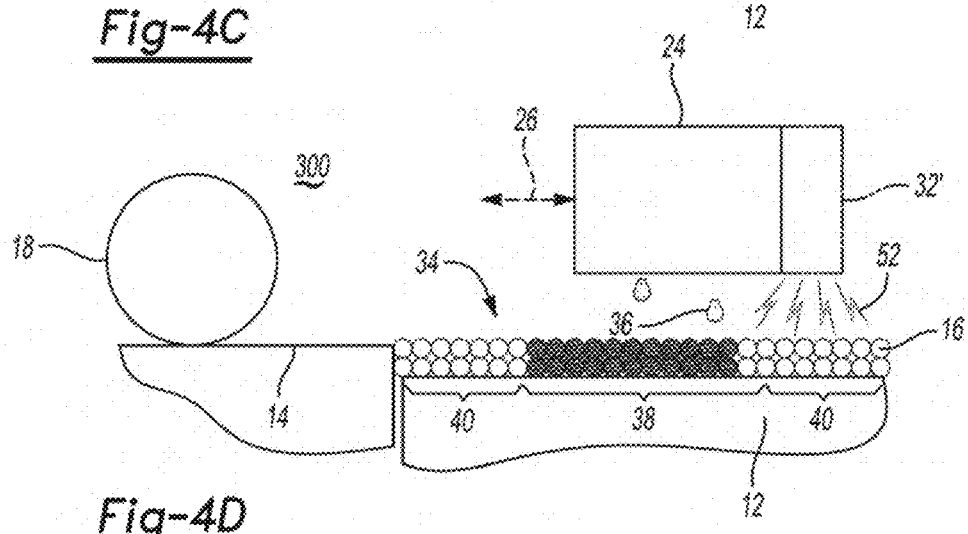

Referring briefly to FIGS. 3C and 3D and FIGS. 4C and 4D, the at least the portion 38 of the build material 16 is patterned. As illustrated in FIGS. 3C and 4C, the wetting amount may be dispensed from the inkjet applicator 24, and then as illustrated in FIGS. 3D and 4D, the remaining amount may be dispensed from the inkjet applicator 24. It is to be understood that the wetting amount is dispensed before the remaining amount. It is also to be understood that the wetting amount and the remaining amount are applied in the same portion(s) (e.g., portion 38).

As mentioned above, the inkjet applicator 24 may be a thermal inkjet printhead, a piezoelectric printhead, etc. Each of the selectively applying of the wetting amount of the binder fluid 36 and the selectively applying of the remaining amount of the binder fluid 36 may be accomplished by thermal inkjet printing, piezo electric inkjet printing, etc.

In some examples of the method 100, the selectively applying of the wetting amount and the selectively applying of the remaining amount take place in a single print pass using separate inkjet printheads that are spatially separated from one another. In this example, the distance that separates the inkjet printheads may range from about 5 mm to about 250 mm. One of the inkjet printheads may be the inkjet applicator 24 and the other of the inkjet printheads may be a second inkjet applicator that is similar to the inkjet applicator 24.

In other examples of the method 100, the selectively applying of the wetting amount and the selectively applying of the remaining amount take place in separate print passes; and the selectively applying of the remaining amount of the binder fluid 36 is accomplished in multiple print passes. In these examples, the wetting amount is applied in the first print pass, and the remaining amount is divided among and applied during the multiple print passes.

When the remaining amount is applied in multiple print passes, the number of print passes used to apply the remaining amount may range from 2 print passes to 8 print passes. In an example, the remaining amount may be applied in 2 print passes. It is believed that these numbers of print passes, used to apply the remaining amount, balance printing speed and maintaining the surface uniformity of the build material 16. Additionally, when the remaining amount is applied over multiple print passes, the print passes that apply the remaining amount may each apply the same amount or may each apply different amounts. In some examples, the remaining amount is equally divided among the multiple print passes so that the same sub-amount is applied in each of the multiple print passes. In this example, the sub-amounts added together equal the remaining amount, and the sub-amount multiplied by the number of multiple print passes equals the remaining amount. For example, the remaining amount (e.g., 33.18 gsm) may be applied in 7 print passes, each of which applies about 4.74 gsm of binder fluid 36. For another example, the remaining amount (e.g., 66.7 gsm) may be applied in 8 print passes, each of which applies about 8.3 gsm of binder fluid 36. In other examples, the remaining amount may be divided among the multiple print passes so that the binder amount is increased stepwise in each subsequent print pass until the total remaining amount is dispensed. For example, the remaining amount (e.g., 26.1 gsm) may be applied in 2 print passes, the first applying 7.1 gsm of the remaining amount and the second applying 19 gsm of the remaining amount.

In still other examples of the method 100, the selectively applying of the wetting amount and the selectively applying of the remaining amount take place in separate print passes; and the selectively applying of the remaining amount of the binder fluid 36 is accomplished in a single print pass. In these examples, the wetting amount is applied in the first print pass, and the remaining amount is applied in the second print pass. In an example, a wetting amount of about 4.74 gsm may be applied in a first print pass, and a remaining amount of about 35 gsm may be applied in a second print pass.

When the selectively applying of the wetting amount and the selectively applying of the remaining amount take place in separate print passes, the remaining amount may be applied using separate inkjet printheads that are spatially separated from one another and apply separate amounts within the same print pass. These inkjet printheads may be used to apply the remaining amount in a single print pass or in multiple print passes. As mentioned above, the distance that separates the inkjet printheads may range from about 5 mm to about 250 mm or more, and the inkjet printheads may be or be similar to the inkjet applicator 24. It should be noted that print head assemblies (also known as printheads) can span multiple meters in width in certain instances.

The method 100 may be used to form a composition. In an example, the composition comprises a patterned build material layer (e.g., 38 in FIGS. 3D and 4D) comprising build material particles 16, interstitial spaces between at least some of the build material particles 16, and the binder fluid (36 in FIGS. 3C and 4C) at least partially filling the interstitial spaces and having been applied in the wetting amount and the subsequent remaining amount, wherein a surface roughness of the patterned build material layer 38 is reduced by at least 40% compared to a surface roughness of a second patterned build material layer having the binder fluid applied thereon in a single amount.

In an example of the composition, the binder fluid fills from about 50 vol % to about 60 vol % of the interstitial spaces. In another example of the composition, the binder fluid fills from about 52 vol % to about 58 vol % of the interstitial spaces.

In the example composition, the patterned build material layer 38 has the binder fluid 36 applied in accordance with the method 100 disclosed herein (i.e., wetting amount followed by remaining amount), and in contrast, the second patterned build material layer has the same amount of the binder fluid 36 all applied at the same time. The surface roughness of the patterned build material layer 38 disclosed herein is reduced when compared to the second patterned build material layer. As mentioned above, the surface roughness of the patterned build material layer 38 is reduced by 40% or more, when compared to the second patterned build material layer. In an example, the surface roughness of the patterned build material layer 38 is reduced by a percentage ranging from about 40% to about 87.5% compared to the surface roughness of the second patterned build material layer. It is believed that the surface roughness may be reduced even more, depending upon the wetting and remaining amounts used. In another example, the surface roughness of the patterned build material layer 38 is reduced by a percentage ranging from about 50% to about 85% compared to the surface roughness of the second patterned build material layer.

The surface roughness may be analyzed using 3D topography mapping and/or image based profilometry.

Referring again to FIG. 2, in some examples, the printer 10 is programmed to perform the method 100. In an example, the printer 10 comprises: a microprocessor 28 to: receive information related to the build material 16 to be used to create a 3D part 50; and based on the received information, identify a pattern for application of the binder fluid 36 on at least a portion 38 of the layer 34 of the build material 16, the pattern including: the wetting amount of the binder fluid 36; and the remaining amount of the binder fluid 36 to be applied after the wetting amount, the wetting amount being sufficient to wet the at least the portion 38 of the layer 34 and insufficient to form a puddle on a surface of the at least the portion 38 of the layer 34, and the remaining amount being sufficient to penetrate the at least the portion 38 of the layer 34 without displacing the at least the portion 38 of the layer 34; and at least one inkjet applicator 24 to selectively apply the wetting amount and the remaining amount.

In an example, the microprocessor 28 may be programmed to select a particular wetting and remaining amount combination based upon the wetting behavior of the build material 16 being used. This enables the printer 10 to select a powder-customized print mode.

In an example, the microprocessor 28 may be programmed to select a particular wetting and remaining amount combination based upon the thickness of the layer 34 of the build material 16, the average size of the build material particles 16, or a combination thereof. For example, the printer 10 may receive information that the build material layers 34 are 100 μm and include an average particle diameter of about 22 μm, and in response, may identify a pattern where the wetting amount is X to be dispensed in the first printing pass, and the remaining amount is 7X to be dispensed over 7 printing passes or a pattern where the wetting amount is X to be dispensed in the first printing pass, and the remaining amount is 8X to be dispensed over 3 printing passes with the sub-amount increasing with each additional printing pass.

In still another example, the input information may include that the layer 34 of the build material 16 is a first layer in the 3D printing process or has a thickness greater than or equal to 100 μm. The printer 10 may be programmed to recognize that particle displacement is more likely to occur with the first layer and/or with thicker layers (e.g., greater than 100 μm), and to adjust the wetting and/or remaining amounts and/or the number of print passes in response.

In an example of the 3D printer 10, the microprocessor 28 further is to: identify a number of print passes over which to apply the remaining amount; and identify sub-amounts of the remaining amount to apply during each of the print passes.

In another example, the 3D printer 10 includes two printheads spatially separated from one another, each of which contains the binder fluid 36, and the microprocessor 28 further is to: command one of the two printheads to apply the wetting amount; and command another of the two printheads to subsequently apply the remaining amount.

The microprocessor 28 may also process print data that is based on a 3D object model of the 3D object/part to be generated. In response to data processing, the microprocessor 28 may control the operations of the build area platform 12, the build material supply 14, the build material distributor 18, and the inkjet applicator 24. As an example, the microprocessor 28 may control actuators (not shown) to control various operations of the 3D printing system 10 components. While the term microprocessor 28 is used, it is to be understood that the microprocessor 28 may be any controller, such as a computing device, a semiconductor-based microprocessor, a central processing unit (CPU), an application specific integrated circuit (ASIC), and/or another hardware device. Although not shown, the microprocessor 28 may be connected to the 3D printing system 10 components via communication lines.

The microprocessor 28 manipulates and transforms data, which may be represented as physical (electronic) quantities within the printer's registers and memories, in order to control the physical elements to create the 3D part. As such, the microprocessor 28 is depicted as being in communication with a data store 30. The data store 30 may include data pertaining to a 3D part to be printed by the 3D printing system 10. The data for the selective delivery of the build material particles 16, the binder fluid 36 (in the wetting amount and then in the remaining amount), etc. may be derived from a model of the 3D part to be formed. For instance, the data may include the locations on each layer of build material particles 16 that the inkjet applicator 24 is to deposit the binder fluid 36 (in the wetting amount and then in the remaining amount), the wetting amount of the binder fluid 36, and the remaining amount of the binder fluid 36. In one example, the microprocessor 28 may use the data to control the inkjet applicator 24 to selectively apply the wetting amount of the binder fluid 36, and then the microprocessor 28 may use the data to control the inkjet applicator 24 to selectively apply the remaining amount of the binder fluid 36. The data store 30 may also include machine readable instructions (stored on a non-transitory computer readable medium) that are to cause the microprocessor 28 to control the amount of build material particles 16 that is supplied by the build material supply 14, the movement of the build area platform 12, the movement of the build material distributor 18, the movement of the inkjet applicator 24, etc.

Each of the previously described physical elements (e.g., the build area platform 12, the build material supply 14, the build material distributor 18, the inkjet applicator 24, etc.) may be operatively connected to the microprocessor 28 of the printing system 10.

As such, in one example, the three-dimensional (3D) printing system 10 generally includes the supply 14 of build material 16; the build material distributor 18; the supply of the binder fluid 36; the inkjet applicator 24 for selectively dispensing the binder fluid 36 in the wetting amount and the remaining amount; at least one heat source 32, 32', 32"; a microprocessor or other controller 28; and a non-transitory computer readable medium having stored thereon computer executable instructions to cause the microprocessor 28 to: utilize the build material distributor 18 to dispense the build material 16; and utilize the inkjet applicator 24 to selectively apply the wetting amount and the remaining amount.

In some examples, the heat source 32, 32' may be a heater 32, 32'. In other examples the heat source 32', 32" may be a source 32', 32" of radiation 52. The heat source 32, 32' may be a heater 32, 32' when the binder fluid 36 includes the binder. In some examples, the heater 32, 32' may be a conductive heater or a radiative heater (e.g., infrared lamps) that is part of the printing system 10. In these examples, the heater 32, 32' of the printing system 10 may be used to heat an entire build material cake 44 (see FIG. 3F) after the patterning is finished. These types of heaters 32 may be placed below the build area platform 12 (e.g., conductive heating from below the platform 12) or may be placed above the build area platform 12 (e.g., radiative heating of the build material layer surface). In these examples, the additional heating processes, e.g., de-binding and sintering, may take place in a heater that is separate from the printing system 10.

Examples of the separate heater include a conventional furnace or oven, a microwave, or devices capable of hybrid heating (i.e., conventional heating and microwave heating). This type of separate heater may be used for heating the cured intermediate part 42' after it is removed from the printing system 10, and/or the at least substantially binder-free part 48 after the cured intermediate part 42' is removed from the build material cake 44 (see FIG. 3G). In other examples, patterning may take place in the printing system 10, and then the build material platform 12 with the patterned intermediate part 42 thereon may be detached from the system 10 and placed into the separate heater for the various heating stages (e.g., curing/activation, de-binding, and sintering).

The heat source 32', 32" may be a source 32', 32" of radiation 52 when the binder fluid 36 includes the active material. In some examples, the source 32" of radiation 52 may be in a fixed position with respect to the build material platform 12. In other examples, the source 32' of radiation 52 may be positioned to apply radiation 52 (see, e.g., FIG. 4D) to the layer 34 of build material particles 16 immediately after the remaining amount of the binder fluid 36 has been applied thereto.

The source 32', 32" of radiation 52 may emit radiation 52 having wavelengths ranging from about 800 nm to about 1 mm. As one example, the radiation 52 may range from about 800 nm to about 2 µm. As another example, the radiation 52 may be blackbody radiation with a maximum intensity at a wavelength of about 1100 nm. The source 32', 32" of radiation 52 may be infrared (IR) or near-infrared light sources, such as IR or near-IR curing lamps, IR or near-IR light emitting diodes (LED), or lasers with the desirable IR or near-IR electromagnetic wavelengths.

In the example shown in FIG. 2, the heat source 32' is attached to the side of the inkjet applicator 24 which allows for printing and heating/exposing to radiation 52 in a single pass. For example, printing and heating/exposing to radiation 52 may be accomplished in a single pass when the wetting amount and the remaining amount are applied in a single print pass using separate inkjet printheads that are spatially separated from one another. In this example, the heat source 32' may be attached to the inkjet printhead that applies the remaining amount, and may be activated after both the wetting and remaining amounts are applied. As another example, the wetting amount and the remaining amount are applied in separate print passes, where the wetting amount is applied first, and then the remaining amount and heating/exposing to radiation 52 are accomplished in a single, subsequent pass.

The heat source 32, 32', 32" may be operatively connected to a lamp/laser driver, an input/output temperature controller, and temperature sensors, which are collectively shown as heat/radiation system components 33. The heat/radiation system components 33 may operate together to control the heat source 32, 32', 32". The temperature recipe (e.g., heat/radiation exposure rate) may be submitted to the input/output temperature controller. During heating, the temperature sensors may sense the temperature of the build material particles 16, and the temperature measurements may be transmitted to the input/output temperature controller. For example, a thermometer associated with the heated area can provide temperature feedback. The input/output temperature controller may adjust the heat source 32, 32', 32" power set points based on any difference between the recipe and the real-time measurements. These power set points are sent to the lamp/laser drivers, which transmit appropriate lamp/laser voltages to the heat source 32, 32', 32". This is one example of the heat/radiation system components 33, and it is to be understood that other heat/radiation source control systems may be used. For example, the controller 28 may be configured to control the heat source 32, 32', 32".

Referring now to FIGS. 3A-3G, another example of the 3D printing method 200 is depicted. In the method 200, the binder fluid 36 includes the binder and is used to create the patterned intermediate part 42 and then the cured intermediate part 42' from the build material particles 16. Also in the method 200, the cured intermediate part 42', once extracted from the build material 16 that was not patterned with the binder fluid 36, undergoes de-binding to produce the at least substantially binder-free part 48, and the at least substantially binder-free part 48 is then sintered to form the final 3D printed part 50.

As used herein, the term "patterned intermediate part" (also known as a patterned green part) refers to a part precursor that has a shape representative of the final 3D printed part 50 and that includes build material 16 patterned with the binder fluid 36. In the patterned intermediate part 42, the build material particles 16 may or may not be weakly bound together by one or more components of the binder fluid 36 and/or by attractive force(s) between the build material particles 16 and the binder fluid 36. In some instances, the mechanical strength of the patterned intermediate part 42 is such that it cannot be handled or extracted from a build material platform 12. Moreover, it is to be understood that any build material 16 that is not patterned with the binder fluid 36 is not considered to be part of the patterned intermediate part 42, even if it is adjacent to or surrounds the patterned intermediate part 42.

As used herein, the term "cured intermediate part" (also known as a cured green part) refers to a patterned intermediate part 42 from which a liquid vehicle of the binder fluid 36 has at least substantially evaporated and/or a patterned intermediate part 42 that has been allowed to reach an activation temperature that initiates activation of the binder so that the binder of the binder fluid 36 forms a glue that coats the build material particles 16 and creates or strengthens the bond between the build material particles 16. In other words, the "cured intermediate part" is a part precursor with a shape representative of the final 3D printed part 50 and that includes build material 16 bound together by at least substantially cured binder particles of the binder fluid 36 (with which the build material 16 was patterned). Compared to the patterned intermediate part 42, the mechanical strength of the cured intermediate part 42' is greater, and in some instances, the cured intermediate part 42' can be handled or extracted from the build material platform 12.

It is to be understood that the term "green" when referring to the patterned green part 42 or the cured green part 42' does not connote color, but rather indicates that the part is not yet fully processed.

As used herein, the term "at least substantially binder-free part" (also known as an at least substantially binder-free gray part") refers to a cured intermediate part 42' that has been exposed to a heating process that initiates thermal decomposition of the binder particles so that the binder particles are at least partially removed. In some instances, volatile organic components of or produced by the thermally decomposed binder particles are completely removed and a very small amount of nonvolatile residue from the thermally decomposed binder particles may remain (e.g., <1 wt % of the initial binder may remain). In other instances, the thermally decomposed binder particles (including any products and residues) are completely removed. In other words, the "at least substantially binder-free part" refers to a part precursor with a shape representative of the final 3D printed part 50 and that includes build material 16 bound together as a result of i) weak sintering (i.e., low level necking between the particles 16, which is able to preserve the part shape), or ii) a small amount of the cured binder particles remaining, or iii) capillary forces and/or Van der Waals resulting from binder particle removal, and/or iv) any combination of i, ii, and/or iii.

It is to be understood that the term "gray" when referring to the at least substantially binder-free gray part 48 does not connote color, but rather indicates that the part is not yet fully processed.

The at least substantially binder-free part 48 may have porosity similar to or greater than the cured intermediate part 42' (due to binder particle removal), but the porosity is at least substantially eliminated during the transition to the 3D printed part 50.

Prior to execution of the method 200 or as part of the method 200, the controller 28 may access data stored in the data store 30 pertaining to a 3D part 50 that is to be printed. The controller 28 may determine the number of layers of build material particles 16 that are to be formed, the locations at which binder fluid 36 (in the wetting amount and then in the remaining amount) from the inkjet applicator 24 is to be deposited on each of the respective layers, the wetting amount of the binder fluid 36, and the remaining amount of the binder fluid 36.

Briefly, the 3D printing method 200 includes: applying the build material 16; and patterning at least a portion 38 of the build material 16 by: selectively applying the wetting amount of the binder fluid 36 on the at least the portion 38 of the build material 16; and subsequently selectively applying the remaining amount of the binder fluid 36 on the at least the portion 38 of the build material 16; wherein the area density in gsm of the wetting amount ranges from about 2 times less to about 30 times less than the area density in gsm of the remaining amount; repeating the applying of the build material 16 and the patterning to create an intermediate part 42, 42'; and heating the intermediate part 42, 42' to form a 3D part 50.

As shown in FIGS. 3A and 3B, the method 200 includes applying the build material 16. The build material 16 may be applied as described above. Additionally, the microprocessor 28 (not shown in FIGS. 3A and 3B) may process control build material supply data, and in response control the build material supply 14 to appropriately position the build material particles 16, and may process control spreader data, and in response control the build material distributor 18 to spread the supplied build material particles 16 over the build area platform 12 to form the layer 34 of build material particles 16 thereon.

Referring now to FIGS. 3C and 3D, the method 200 continues by patterning at least a portion 38 of the build material 16 by: selectively applying the wetting amount of the binder fluid 36 on the at least the portion 38 of the build material 16 (FIG. 3C); and subsequently selectively applying the remaining amount of the binder fluid 36 on the at least the portion 38 of the build material 16 (FIG. 3D); wherein the area density in gsm of the wetting amount ranges from about 2 times less to about 30 times less than the area density in gsm of the remaining amount.

In the method 200, the binder fluid 36 includes the binder and a liquid vehicle. In some instances, the binder fluid 36 consists of the binder and the liquid vehicle, without any other components.

In some examples, the binder particles are dissolved or dispersed throughout the liquid vehicle. When applied to the layer 34 of the build material 16 in stages, the liquid vehicle is capable of wetting the build material 16 and the binder particles are capable of penetrating into the microscopic pores/voids of the layer 34 (i.e., the spaces between the build material particles 16) without puddling or displacing the build material 16. In an example, the binder particles in the binder fluid 36 can be activated or cured by bringing them to or allowing them to reach an activation temperature at or above the minimum film formation temperature (MFFT) of the binder fluid 36. In another example, the binder particles in the binder fluid 36 can be activated or cured by evaporating the liquid vehicle of the binder fluid 36. When activated or cured, the binder fluid 36 may form an at least substantially continuous network gluing the build material particles 16 into the cured intermediate part 42'. The cured intermediate part 42' has enough mechanical strength such that it is able to withstand extraction from the build material platform 12 without being deleteriously affected (e.g., the shape is not lost).

Once extracted, the cured intermediate part 42' can be debound by heating the cured intermediate part 42' to the thermal decomposition temperature of the binder particles to thermally decompose the binder particles. When at least some of the binder particles are thermally decomposed, an at least substantially binder-free part 48 is formed. Then, the at least substantially binder-free part 48 can be heated to a sintering temperature to sinter the build material particles 16 and form the 3D part 50.

The binder particles are sacrificial intermediate binders in that they are present in various stages of the intermediate part 42, 42' that is formed, and then are ultimately removed (through thermal decomposition) from the at least substantially binder-free part 48, and thus are not present in the final sintered 3D part 50.

The binder may be any binder that is: i) jettable via inkjet printing (e.g., from a thermal inkjet printhead, a piezoelectric printhead, or a continuous inkjet printhead) in the binder fluid 36, ii) able to wet and/or penetrate the layer 34 of the build material 16, iii) activatable/curable (i.e., able to bind the build material particles 16 to form the cured intermediate part 42), and iv) able to be thermally decomposed at a thermal decomposition temperature that is below the melting temperature of the build material 16.

In some examples of the method 200, the binder may be activated by bringing the binder particles to or allowing the binder particles to reach an activation temperature that equals or exceeds the minimum film formation temperature (MFFT) of the binder fluid 36. In an example, an entire layer 34 of the build material 16, including a portion 38 having the binder fluid 36 selectively applied thereon, may be brought to the activation temperature. At temperatures at or above the MFFT, the binder particles coalesce and form a polymer glue that coats the build material particles 16 and creates the cured intermediate part 42'. In other words, at or above the MFFT, the binder particles coalesce to form a continuous networking binding the patterned volume of build material particles 16 into the cured intermediate part 42'. In these examples, bringing the pattered intermediate part 42 to or allowing the pattered intermediate part 42 to reach the activation temperature (e.g., the MFFT of the binder fluid 36) activates the binder. The method 200 may include actively heating the patterned intermediate part 42, or the patterned intermediate part 42 may be passively allowed to reach the activation temperature in the surrounding environment without the application of additional heat.

In other examples of the method 200, the binder may be activated by at least substantially evaporating the liquid vehicle of the binder fluid 36. In these examples, the binder may be soluble in the liquid vehicle of the binder fluid 36 and may form a glue that coats the build material particles 16 and creates the cured intermediate part 42' once the liquid vehicle has at least substantially evaporated. The method 200 may include heating the pattered intermediate part 42 to at least substantially evaporate the liquid vehicle and activate the binder, or the liquid vehicle may be allowed to at least substantially evaporate without heating.

Examples of the binder that may be activated by reaching or exceeding the MFFT activation temperature include latex polymer particles. As such, in some examples of the method 200, the binder is a latex. As used herein, the term "latex" refers to a polymer that is capable of being dispersed in an aqueous medium. The latex may be a colloidal dispersion of polymer particles in the liquid vehicle of the binder fluid 36.

The polymer particles of the latex may have several different morphologies. For example, the polymer particles may be individual spherical particles containing polymer compositions of high $T_g$ hydrophilic (hard) component(s) and/or low $T_g$ hydrophobic (soft) component(s) that may be interdispersed according to IPN (interpenetrating networks), although it is contemplated that the high $T_g$ hydrophilic and low $T_g$ hydrophobic components may be interdispersed in other ways. For another example, the polymer particles may be made of a low T hydrophobic core surrounded by a continuous or discontinuous high $T_g$ hydrophilic shell. For another example, the polymer particle morphology may resemble a raspberry, in which a low $T_g$ hydrophobic core is surrounded by several smaller high $T_g$ hydrophilic particles that are attached to the core. For still another example, the polymer particles may include 2, 3, or 4 particles that are at least partially attached to one another.

The high $T_g$ hydrophilic component(s)/shell/particles and low $T_g$ hydrophilic component(s)/core/particles may be defined in relation to each other (i.e., the high $T_q$ hydrophilic component(s)/shell/particles have a $T_g$ higher than the low T hydrophilic component(s)/core/particles, and the low $T_g$ hydrophilic component(s)/core/particles have a $T_g$ lower than the high T hydrophilic component(s)/shell/particles). In some examples, the high $T_g$ hydrophilic component(s)/shell/particles have a $T_g$ higher than 25° C. In other examples, the high $T_g$ hydrophilic component(s)/shell/particles have a $T_g$ higher than 45° C. In some examples, the low T hydrophilic component(s)/core/particles have a $T_g$ lower than 25° C. In other examples, the low $T_g$ hydrophilic component(s)/core/particles have a $T_g$ lower than 5° C.

In some examples disclosed herein, the polymer particles of the latex are heteropolymers or co-polymers. The heteropolymers may include a more hydrophobic component and a more hydrophilic component. In these examples, the hydrophilic component renders the particles dispersible in the binder fluid 36, while the hydrophobic component is capable of coalescing upon reaching the MFFT in order to temporarily bind the build material particles 16 together to form the cured intermediate part 42'.

Examples of low $T_g$ monomers that may be used to form the hydrophobic component include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a high $T_g$ hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In the heteropolymers disclosed herein, the low $T_g$ hydrophobic component(s) make up from about 65% to about 100% of the polymer, and the high T hydrophilic component(s) make up from about 0.1% to about 35% of the polymer.

In an example, the selected monomer(s) is/are polymerized to form the desirable heteropolymer. Any suitable polymerization process may be used. For example, hydrophobic-hydrophilic polymer particles can be formed by any of a number of techniques, such as: i) attaching a high $T_g$ hydrophilic polymer onto the surface of a low $T_g$ hydrophobic polymer, ii) copolymerizing low $T_g$ hydrophobic and high $T_g$ hydrophilic monomers using ratios that lead to a more high $T_g$ hydrophilic outer component or shell, iii) adding high $T_g$ hydrophilic monomer (or excess high $T_g$ hydrophilic monomer) toward the end of the copolymerization process so there is a higher concentration of high $T_g$ hydrophilic monomer copolymerized at or near the surface, or iv) any other method known in the art to generate a higher $T_g$ hydrophilic outer component or shell relative to the inner component or core. These hydrophobic-hydrophilic polymer particles may be core-shell particles. It is to be understood, however, that these techniques may also form latex polymer particles with other morphologies, as noted herein.

Some specific examples of the latex polymer particles are formed with the following monomer combinations: i) butyl acrylate, styrene, methyl methacrylate, and methacrylic acid; or ii) butyl acrylate, methyl methacrylate, methacrylic acid, cyclohexyl methacrylate, cyclohexyl acrylate, and 2-phenoxyethyl methacrylate.

The polymer particles of the latex may have a particle size that can be jetted via thermal inkjet printing or piezoelectric printing or continuous inkjet printing. In an example, the particle size of the polymer particles ranges from about 10 nm to about 300 nm.

In some examples, the polymer particles of the latex may have a glass transition temperature ($T_g$ that is greater (e.g., >) than ambient temperature. In other examples, the polymer particles may have a glass transition temperature ($T_g$) that is much greater (e.g., >>) than ambient temperature (i.e., at least 15° higher than ambient). As used therein, "ambient temperature" may refer to room temperature (e.g., ranging about 18° C. to about 22° C.), or to the temperature of the environment in which the 3D printing method 200 is performed. Examples of the 3D printing environment ambient temperature may range from about 40° C. to about 50° C. The glass transition temperature $T_g$ of the bulk material (e.g., the more hydrophobic portion) of the polymer particles may range from 25° C. to about 125° C. In an example, the glass transition temperature $T_g$ of the bulk material (e.g., the more hydrophobic portion) of the polymer particles is about 40° C. or higher. The glass transition temperature $T_g$ of the bulk material may be any temperature that enables the polymer particles to be inkjet printed without becoming too soft at the printer operating temperatures.

When the polymer particles, as the binder in the binder fluid 36, are brought to or allowed to reach the MFFT (or a temperature above the MFFT), a first solvent of the binder fluid 36 may evaporate and allow a second solvent of the binder fluid 36 to come into contact with and soften the polymer particles. Then as the second solvent evaporates, the softened polymer particles may merge or coalesce to form a continuous network or film to bind the patterned volume of build material particles 16 into the cured intermediate part 42'. In an example, the binder fluid 36 may have a MFFT ranging from about 11° C. to about 90° C. In another example, the binder fluid 36 may have a MFFT of about 43° C.

The weight average molecular weight of the polymer particles may range from about 5,000 Mw to about 500,000 Mw. In some examples, the weight average molecular weight of the polymer particles ranges from about 100,000 Mw to about 500,000 Mw. In some other examples, the weight average molecular weight of the polymer particles ranges from about 150,000 Mw to 300,000 Mw.

Examples of the binder that may be activated by at least substantially evaporating the liquid vehicle of the binder fluid 36 include small molecular species and short chain polymers that i) have enough adhesive strength to hold the cured intermediate part 42' together 16 with enough mechanical stability to survive removal from the build material cake 44, and ii) are at least partially soluble in the liquid vehicle of the binder fluid 36. In an example, the binder may have a solubility in the liquid vehicle that is higher than 0.5 wt %, when measured at a temperature corresponding to that of the printing environment. In another example, the binder solubility may be higher than 2 wt %. In still another example, the binder may have a solubility high enough that the binder may be fully dissolved in the liquid vehicle. The solubility of the binder in the liquid vehicle may allow the binder fluid 36 to be jetted via inkjet printing, and once the liquid vehicle is at least substantially evaporated, the binder is able to hold the cured intermediate part 42' together.

Examples of these binders include polyacrylates, sugars, sugar alcohols, polymeric or oligomeric sugars, polycarboxylic acids, polysulfonic acids, water soluble polymers containing carboxylic or sulfonic moieties, polyvinyl alcohol, polyethers, polyvinylpyrrolidone, polyether alkoxy silane, and combinations thereof. Some specific examples include glucose ($C_6H_{12}O_6$), sucrose ($C_{12}H_{22}O_{11}$), fructose ($C_6H_{12}O_6$), maltodextrines with a chain length ranging from 2 units to 20 units, sorbitol ($C_6H_{14}O_6$), erythritol ($C_4H_{10}O_4$), mannitol ($C_6H_{14}O_6$), polyethylene glycol and/or a co-polymer thereof, polypropylene glycol and/or a co-polymer thereof, or CARBOSPERSE® K7028 (a short chain polyacrylic acid, M~2,300 Da, available from Lubrizol). Other examples include low or moderate molecular weight polycarboxylic acids (e.g., having a molecular weight less than 5,000 Da) and higher molecular weight polycarboxylic acids (e.g., having a molecular weight greater than 5,000 Da up to 10,000 Da).

While several example binders have been described, in an example of the binder fluid 36, the binder may be selected from the group consisting of acrylic latex binders, polyvinyl alcohols, polyvinylpyrrolidones, and combinations thereof.

The binder may be present in the binder fluid 36 in an amount ranging from about 2 wt % to about 30 wt %, or from about 3 wt % to about 20 wt %, or from about 5 wt % to about 15 wt % (based upon the total weight of the binder fluid 36). In another example, the binder may be present in the binder fluid 36 in an amount ranging from about 20 vol % to about 40 vol % (based upon the total vol % of the binder fluid 36). It is believed that these binder loadings provide a balance between the binder fluid 36 having jetting reliability and binding efficiency.

As mentioned above, the binder fluid 36 includes the binder and the liquid vehicle. As used herein, "liquid vehicle" may refer to the liquid fluid in which the binder particles are dispersed or dissolved to form the binder fluid 36. A wide variety of liquid vehicles, including aqueous and non-aqueous vehicles, may be used with the binder fluid 36. In some instances, the liquid vehicle consists of a primary solvent with no other components. In other examples, the binder fluid 36 may include other ingredients, depending, in part, upon the inkjet applicator 24 that is to be used to dispense the binder fluid 36. Examples of other suitable binder fluid components include co-solvent(s), surfactant(s), antimicrobial agent(s), anti-kogation agent(s), and/or sequestering agent(s).

The primary solvent may be water or a non-aqueous solvent (e.g., ethanol, acetone, n-methyl pyrrolidone, aliphatic hydrocarbons, etc.). In some examples, the binder fluid 36 consists of the binder particles and the primary solvent (with on other components). In these examples, the primary solvent makes up the balance of the binder fluid 36.

Classes of organic co-solvents that may be used in the water-based binder fluid 36 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents (i.e., humectants), which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the binder fluid 36 in a total amount ranging from about 1 wt % to about 50 wt % based upon the total weight of the binder fluid 36, depending upon the jetting architecture of the inkjet applicator 24. In an example, the total amount of the co-solvent(s) present in the binder fluid 36 is 25 wt % based on the total weight of the binder fluid 36.

The co-solvent(s) of the binder fluid 36 may depend, in part upon the jetting technology that is to be used to dispense the binder fluid 36. For example, if thermal inkjet is to be used, water and/or ethanol and/or other longer chain alcohols (e.g., pentanol) may be the primary solvent or co-solvents (i.e., makes up 35 wt % or more of the binder fluid 36). For another example, if piezoelectric inkjet is to be used, water may make up from about 25 wt % to about 30 wt % of the binder fluid 36, and the primary solvent (i.e., 35 wt % or more) may be ethanol, isopropanol, acetone, etc.

In some examples, the liquid vehicle of the binder fluid 36 includes a coalescing solvent. In these examples, the coalescing solvent may plasticize the binder particles and enhances the coalescing of the binder particles upon reaching the MFFT in order to temporarily bind the build material particles 16 together to form the cured intermediate part 42'. In some examples, the binder fluid 36 may consist of the binder particles and the coalescing solvent (with no other components). In these examples, the liquid vehicle consists of the coalescing solvent (with no other components), and the coalescing solvent makes up the balance of the binder fluid 36.

In some examples, the coalescing solvent may be a lactone, such as 2-pyrrolidinone, 1-(2-hydroxyethyl)-2-pyrrolidone, etc. In other examples, the coalescing solvent may be a glycol ether or a glycol ether esters, such as tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, etc. In still other examples, the coalescing solvent may be a water-soluble polyhydric alcohol, such as 2-methyl-1,3-propanediol, etc. In still other examples, the coalescing solvent may selected from any of the listed solvent or may be a combination of any of the examples above.

The coalescing solvent may be present in the binder fluid 36 in an amount ranging from about 0.1 wt % to about 50 wt % (based upon the total weight of the binder fluid 36). In some examples, greater or lesser amounts of the coalescing solvent may be used depending, in part, upon the jetting architecture of the inkjet applicator 24.

As mentioned above, in some examples the liquid vehicles includes surfactant(s) to achieve a low surface tension (e.g., a surface tension less than or equal to about 40 dyn/cm) of the binder fluid 36. Surfactant(s) may also be used to improve the jettability of the binder fluid 36. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ MN-6, TERGITOL™ 15-S-7, or TERGITOL™ 15-S-9 (a secondary alcohol ethoxylate) from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the binder fluid 36 may range from about 0.01 wt % to about 10 wt % based on the total weight of the binder fluid 36. In an example, the total amount of surfactant(s) in the binder fluid 36 may be about 2.98 wt % based on the total weight of the binder fluid 36.

The liquid vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor), ACTICIDE® M20 (Thor), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the binder fluid 36 may include a total amount of antimicrobial agents that ranges from about 0.05 wt % to about 1 wt %. In an example, the antimicrobial agent(s) is/are a biocide(s) and is/are present in the binder fluid 36 in an amount of about 0.25 wt % (based on the total weight of the binder fluid 36).

An anti-kogation agent may be included in the binder fluid 36. Kogation refers to the deposit of dried ink (e.g., binder fluid 36) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the binder fluid 36 may range from greater than 0.20 wt % to about 0.62 wt % based on the total weight of the binder fluid 36. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Sequestering agents (or chelating agents) may be included in the liquid vehicle to eliminate the deleterious effects of heavy metal impurities. Examples of suitable sequestering agents include disodium ethylenediaminetetraacetic acid (EDTA-Na), ethylene diamine tetra acetic acid (EDTA), and methylglycinediacetic acid (e.g., TRILON® M from BASF Corp.).

Whether a single sequestering agent is used or a combination of sequestering agents is used, the total amount of sequestering agent(s) in the binder fluid 36 may range from greater than 0 wt % to about 2 wt % based on the total weight of the binder fluid 36. In an example, the sequestering agent(s) is/are present in the binder fluid 36 in an amount of about 0.04 wt % (based on the total weight of the binder fluid 36).

The composition of the liquid vehicle may depend on the binder used. For example, the binder may be an acrylic latex, and the liquid vehicle may include 2-methyl-1,3-propanediol, 2-pyrrolidone, a non-ionic surfactant, a fluorosurfactant and a balance of water. As another example, the binder may be polyvinyl alcohol, and the liquid vehicle may include 2-pyrrolidone and a balance of water.

The portion 38 may be patterned with the binder fluid 36, in the wetting amount and then in the remaining amount, as described above. Additionally, the microprocessor 28 may process data, and in response, control the inkjet applicator 24 (e.g., in the directions indicated by the arrow 26) to deposit the binder fluid 36 (in the wetting amount and then in the remaining amount) onto predetermined portion(s) 38 of the build material 16 that are to become part of the patterned intermediate part 42 and are to ultimately be sintered to form the 3D part 50. The inkjet applicator 24 may be programmed to receive commands from the microprocessor 28 and to deposit the binder fluid 36 (in the wetting amount and then in the remaining amount) according to a pattern of a cross-section for the layer of the 3D part that is to be formed. As used herein, the cross-section of the layer of the 3D part to be formed refers to the cross-section that is parallel to the surface of the build area platform 12. In the example shown in FIGS. 3C and 3D, the inkjet applicator 24 selectively applies the binder fluid 36 (in the wetting amount and then in the remaining amount) on those portion(s) 38 of the layer 34 that is/are to become the first layer of the 3D part 50. As an example, if the 3D part that is to be formed is to be shaped like a cube or cylinder, the binder fluid 36 (in the wetting amount and then in the remaining amount) will be deposited in a square pattern or a circular pattern (from a top view), respectively, on at least a portion of the layer 34 of the build material particles 16. In the example shown in FIGS. 3C and 3D, the binder fluid 36 (in the wetting amount and then in the remaining amount) is deposited in a square pattern on the portion 38 of the layer 34 and not on the portions 40.

It is to be understood that a single binder fluid 36 may be selectively applied (in the wetting amount and then in the remaining amount) to pattern the layer 34, or multiple binder fluids 36 may be selectively applied (in the wetting amount and then in the remaining amount) to pattern the layer 34.

When the binder fluid 36 is selectively applied in the desired portion(s) 38 in the wetting amount, the binder fluid 36 (including the binder therein) wets the build material particles 16, effectively forming liquid bridges between the particles 16 that lock the particles at the surface of the layer 34 in place. When the binder fluid 36 is selectively applied in the desired portion(s) 38 in the remaining amount, the binder fluid 36 (including the binder therein) infiltrates the inter-particle spaces (i.e., voids) among the build material particles 16. The total volume (i.e., the wetting amount plus the remaining amount) of the binder fluid 36 that is applied per unit of the build material 16 in the patterned portion 38 may be sufficient to fill a major fraction, or most of the porosity existing within the thickness of the portion 38 of the layer 34.

It is to be understood that portions 40 of the build material 16 that do not have the binder fluid 36 applied thereto also do not have the binder particles introduced thereto. As such, these portions 40 do not become part of the patterned intermediate part 42 that is ultimately formed.

Figure 3E:
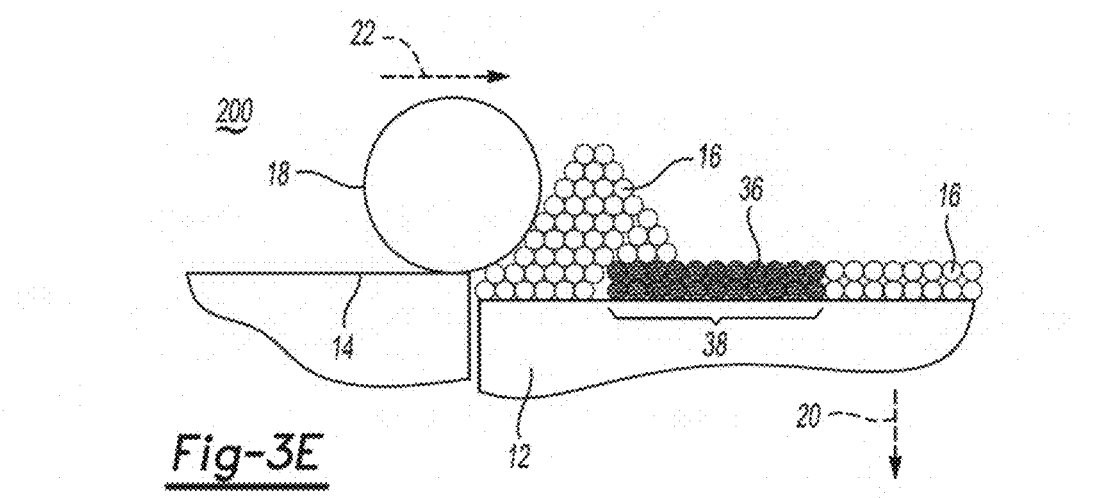

In some examples, the method 200 further comprises: repeating the applying of the build material 16 and the patterning to create an intermediate part 42, 42'; and heating the intermediate part 42, 42' to form a 3D part 50. The processes shown in FIGS. 3A-3D may be repeated to iteratively build up several patterned layers and to form the patterned intermediate part 42. FIG. 3E illustrates the initial formation of a second layer of build material 16 on the layer 34 patterned with the binder fluid 36. In FIG. 3E, following deposition of the binder fluid 36 onto predetermined portion(s) 38 of the layer 34 of build material 16, the microprocessor 28 may execute instructions to cause the build area platform 12 to be moved a relatively small distance in the direction denoted by the arrow 20. In other words, the build area platform 12 may be lowered to enable the next layer of build material 16 to be formed. For example, the build material platform 12 may be lowered a distance that is equivalent to the height of the layer 34. In addition, following the lowering of the build area platform 12, the microprocessor 28 may control the build material supply 14 to supply additional build material 16 (e.g., through operation of an elevator, an auger, or the like) and the build material distributor 18 to form another layer of build material particles 16 on top of the previously formed layer 34 with the additional build material 16. The newly formed layer may be patterned with binder fluid 36.

In some examples of the method 200, prior to the heating of the intermediate part 42, 42' to form the 3D part 50, the method further comprises allowing the intermediate part 42, 42' to reach an activation temperature to activate the binder of the binder fluid 36. In other examples of the method 200, prior to the heating of the intermediate part 42, 42' to form the 3D part 50, the method 200 further comprises at least substantially evaporating the liquid vehicle of the binder fluid 36 to activate the binder of the binder fluid 36.

Referring back to FIG. 3D, in another example of the method 200, the layer 34 may be exposed to heating using heater 32' after the binder fluid 36 (in the wetting amount and then in the remaining amount) is applied to the layer 34 and before another layer is formed. In an example, the heater 32' may be used for activating the binder fluid 36 during printing layer-by-layer, and for producing a stabilized and cured intermediate part layer. In these examples, heating to form the cured intermediate part layer may take place at a temperature that is capable of activating (or curing) the binder of the binder fluid 36, but that is not capable of thermally decomposing the binder or sintering the build material 16. In an example, the activation temperature is at or above the MFFT of the binder fluid 36. Other examples of suitable activation temperatures are provided below. In another example, the heater 32' may be used for at least substantially evaporating the liquid vehicle of the binder fluid 36 during printing layer-by-layer, and for producing a stabilized and cured intermediate part layer. In these examples, heating to form the cured intermediate part layer may take place at a temperature that is capable of evaporating the liquid vehicle (or curing the binder), but that is not capable of thermally decomposing the binder or sintering the build material 16. Examples of suitable evaporation temperatures are provided below.

In the example in which the layer 34 may be exposed to heating using heater 32', the processes shown in FIGS. 3A-3D (including the heating of the layer 34) may be repeated to iteratively build up several cured layers and to produce the cured intermediate part 42'. The cured intermediate part 42' can then be exposed to the processes described in reference to FIG. 3G.

Figure 3F:
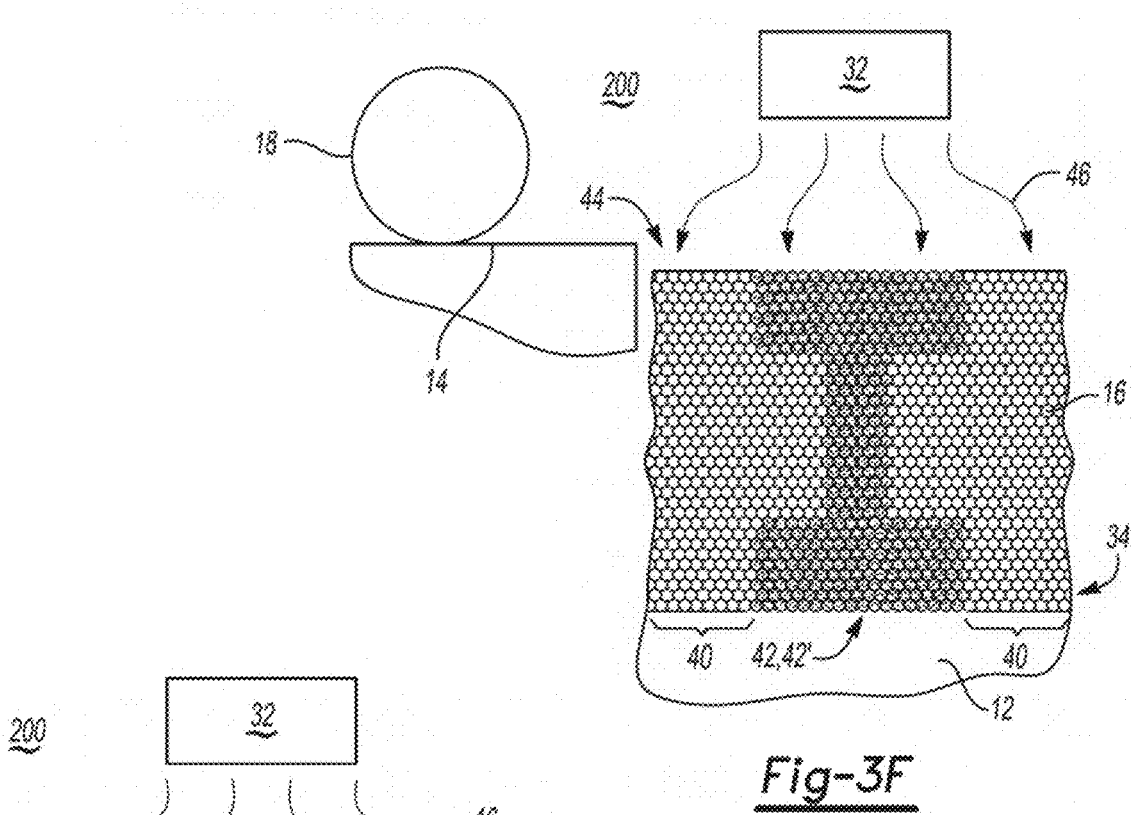

Repeatedly forming and patterning new layers (without activating and curing each layer) results in the formation of a build material cake 44, as shown in FIG. 3F, which includes the patterned intermediate part 42 residing within the non-patterned portions 40 of each of the layers 34 of build material 16. The patterned intermediate part 42 is a volume of the build material cake 44 that is filled with the build material 16 and the binder fluid 36 within the interparticle spaces. The remainder of the build material cake 44 is made up of the non-patterned build material 16.

Also as shown in FIG. 3F, the build material cake 44 may be exposed to heat or radiation to generate heat, as denoted by the arrows 46. In an example, the heat applied may be sufficient to activate the binder fluid 36 in the patterned intermediate part 42 and to produce a stabilized and cured intermediate part 42'. In another example, the heat applied may be sufficient to least substantially evaporate the liquid vehicle of the binder fluid 36 in the patterned intermediate part 42 and to produce a stabilized and cured intermediate part 42'. In one example, the heat source 32 may be used to apply the heat to the build material cake 44. In the example shown in FIG. 3F, the build material cake 44 may remain on the build area platform 12 while being heated by the heat source 32. In another example, the build area platform 12, with the build material cake 44 thereon, may be detached from the inkjet applicator 24 and placed in the heat source 32. Any of the previously described heat sources 32 and/or 32' may be used.

In the examples of the method 200 that include allowing the patterned intermediate part 42 to reach the activation temperature to activate the binder, the activation/curing temperature may depend, in part, on one or more of: the $T_g$ of the binder particles, the melt viscosity of the binder particles, and/or whether and which coalescing solvent is used.

In some examples, the patterned intermediate part 42 may be heated to the activation temperature to activate the binder. In these examples, heating to form the cured intermediate part 42' may take place at a temperature that is capable of activating (or curing) the binder of the binder fluid 36, but that is not capable of sintering the build material 16 or of thermally degrading the binder particles. In an example, the activation temperature is at or above the minimum film formation temperature (MFFT) of the binder fluid 36 and below the thermal decomposition temperature of the binder particles (i.e., below a temperature threshold at which thermal decomposition occurs). For a majority of suitable latex-based polymer particles, the upper limit of the activation/curing temperature ranges from about 250° C. to about 270° C. Above this temperature threshold, the polymer particles would chemically degrade into volatile species and leave the patterned intermediate part 42, and thus would stop performing their function. In other examples, the activation temperature may be greater than the MFFT of the binder fluid 36. As an example, the activation temperature may range from about 10° C. to about 200° C. As another example, the activation temperature may range from about 11° C. to about 150° C. As still another example, the activation temperature may range from about 25° C. to about 90° C. As still another example, the activation temperature may be about 50° C.

The length of time for which the heat 46 is applied may be dependent, for example, on one or more of: characteristics of the heat or radiation source 32, 32', characteristics of the binder particles, characteristics of the build material 16 (e.g., type, particle size, etc.), and/or the characteristics of the 3D part 50 (e.g., wall thickness). The patterned intermediate part 42 may be heated at the activation temperature for an activation/curing time period ranging from about 1 minute to about 360 minutes The rate at which the patterned intermediate part 42 is heated to the activation temperature may depend, in part, on one or more of: the binder fluid 36 used, the size (i.e., thickness and/or area (across the x-y plane)) of the layer 34 of build material 16, and/or the characteristics of the 3D part 50 (e.g., size, wall thickness, etc.). The patterned intermediate part 42 may be heated to the activation temperature at a rate of about 1° C./minute to about 10° C./minute, although it is contemplated that a slower or faster heating rate may be used.

In some examples of the method 200, the patterned intermediate part 42 may be allowed to reach the activation temperature without heating. For example, when the MFFT is at or below ambient temperature, the patterned intermediate part 42 may be allowed to reach the activation temperature without an external heat source. As mentioned above, "ambient temperature" may refer to room temperature (e.g., ranging about 18° C. to about 22° C.), or to the temperature of the environment in which the 3D printing method 200 is performed (e.g., the temperature of the build area platform 12 during the forming and patterning of new layers). In an example, the patterned intermediate part 42 may reach the activation temperature without heating within a time period ranging from about 5 minutes to about 90 minutes.

Bringing the patterned intermediate part 42 to or allowing the patterned intermediate part 42 to reach the activation temperature may cause the binder particles to coalesce into a continuous polymer phase among the build material particles 16 of the patterned intermediate part 42. As mentioned above, the coalescing solvent (when included in the binder fluid 36) plasticizes the binder particles and enhances the coalescing of the binder particles. The continuous polymer phase may act as a heat-activated adhesive between the build material particles 16 to form the stabilized, cured intermediate part 42'.

Bringing the patterned intermediate part 42 to or allowing the patterned intermediate part 42 to reach the activation temperature to form the cured intermediate part 42' may also result in the evaporation of a significant fraction of the liquid vehicle from the patterned intermediate part 42. The evaporation may result in some densification, through capillary action, of the cured intermediate part 42'.

In the examples of the method 200 that include at least substantially evaporating the liquid vehicle of the binder fluid 36, it is to be understood that at least substantial evaporation may be partial evaporation or complete evaporation. At least substantial evaporation of the liquid vehicle may be partial evaporation when the presence of residual liquid vehicle does not deleteriously affect the desired structural integrity of the cured intermediate part 42'. In these examples, the cured intermediate part 42' formed by the at least substantial evaporation of the liquid vehicle of the binder fluid 36 may contain residual amounts of the liquid vehicle, but the liquid vehicle is completely removed during de-binding. In an example, after at least substantial evaporation of the liquid vehicle, the cured intermediate part 42' may contain less than about 2 wt % of the liquid vehicle (based on the total weight of the cured intermediate part 42'). In another example, after at least substantial evaporation of the liquid vehicle, the cured intermediate part 42' may contain less than about 0.5 wt % of the liquid vehicle. In still another example, after at least substantial evaporation of the liquid vehicle, the cured intermediate part 42' may contain about 0.1 wt % or less of the liquid vehicle. The (partial or complete) evaporation of the liquid vehicle causes the binder to form a glue or adhesive that coats the build material particles 16 and creates the cured intermediate part 42'. The (partial or complete) evaporation of the liquid vehicle may also cause densification of the build material particles 16 in the at least the portion 38. The densification of the build material particles 16 may be due to capillary compaction. As mentioned above, evaporation of the liquid vehicle may take place after a patterned intermediate part 42 has been formed, or as each layer of the patterned intermediate part 42 is formed.

The temperature of the environment in which the 3D printing method 200 is performed (e.g., the temperature of the build area platform 12 during the forming and patterning of new layers) may be about 5° C. to about 50° C. below the boiling point of the liquid vehicle (or the primary solvent of the liquid vehicle). In an example, the temperature of the build area platform 12 during the forming and patterning of new layers ranges from about 50° C. to about 95° C. Other examples of the 3D printing environment temperature may range from about 40° C. to about 50° C.

In some examples, the patterned intermediate part 42 may be heated to at least substantially evaporate the liquid vehicle. In these examples, heating may take place at a temperature and for a time period that is capable of at least partially evaporating the liquid vehicle of the binder fluid 36, which may cause the binder to form a glue among the build material particles 16 and form the cured intermediate part 42' (or a cured intermediate part layer). In an example, the evaporation temperature may be above ambient temperature. As mentioned above, "ambient temperature" may refer to room temperature (e.g., ranging about 18° C. to about 22° C.), or to the temperature of the environment in which the 3D printing method 200 is performed (e.g., the temperature of the build area platform 12 during the forming and patterning of new layers). In another example, the evaporation temperature is below a temperature at which the binder would be damaged (i.e., be unable to bind the cured intermediate part 42'). For a majority of binders soluble in the liquid vehicle, the upper limit of the evaporation temperature ranges from about 180° C. to about 220° C. Above this temperature threshold, the binder may chemically degrade into volatile species and leave the patterned intermediate part 42, and thus would stop performing its function. For a majority of liquid vehicles, the evaporation temperature ranges from about 50° C. to about 220° C. As another example, the evaporation temperature may range from about 10° C. to about 100° C. As still another example, the evaporation temperature may range from about 70° C. to about 90° C.

The evaporation time may depend, in part, on the evaporation temperature and/or the liquid vehicle used. For example, a higher evaporation temperature and/or a more volatile liquid vehicle may result in a shorter evaporation time period, and a lower evaporation temperature and/or a less volatile liquid vehicle may result in a longer evaporation time period. Evaporation, and thus the formation of the cured intermediate part 42', may vary, depending upon the temperature, humidity, and/or air circulation. For a majority of liquid vehicles, the evaporation time period ranges from about 1 second to about 1 minute per layer. In an example, the evaporation time period is about 15 seconds.

The heating rate may depend, in part, on one or more of the binder fluid 36 used, the size (i.e., thickness and/or area (across the x-y plane)) of the layer 34, and/or the characteristics of the 3D part 50 (e.g., size, wall thickness, etc.). The patterned intermediate part 42 may be heated to the evaporation temperature at a rate of about 1° C./minute to about 10° C./minute, although it is contemplated that a slower or faster heating rate may be used.

In some examples of the method 200, the liquid vehicle of the binder fluid 36 may be allowed to evaporate without heating. For example, more volatile solvents (e.g., acetone) can evaporate in seconds at room temperature. In these examples, build material cake 44 or an individual patterned layer is not exposed to heat or radiation to generate heat, and the liquid vehicle evaporates over time. In an example, the liquid vehicle may evaporate without heating within a time period ranging from about 1 second to about 1 minute.

At least substantially evaporating (with or without heating) the liquid vehicle the binding of the build material particles 16 and forms the cured intermediate part 42'. The at least substantial evaporation of the liquid vehicle also may result in the densification of the build material particles 16 through capillary action.

The stabilized, cured intermediate part 42' exhibits handleable mechanical durability.

The cured intermediate part 42' may then be extracted from the build material cake 44. The cured intermediate part 42' may be extracted by any suitable means. In an example, the cured intermediate part 42' may be extracted by lifting the cured intermediate part 42' from the unpatterned build material particles 16. An extraction tool including a piston and a spring may be used.

When the cured intermediate part 42' is extracted from the build material cake 44, the cured intermediate part 42' may be removed from the build area platform 12 and placed in a heating mechanism. The heating mechanism may be the heater 32.

In some examples, the cured intermediate part 42' may be cleaned to remove unpatterned build material particles 16 from its surface. In an example, the cured intermediate part 42' may be cleaned with a brush and/or an air jet.

After the extraction and/or the cleaning of the cured intermediate part 42', the cured intermediate part 42' may be heated to form the 3D part 50. In an example of the method 200, heating of the intermediate part 42' to form the 3D part 50 includes: heating the intermediate part 42' to a thermal decomposition temperature of the binder included in the binder fluid 36 to create an at least substantially binder-free part 48; and heating the at least substantially binder-free part 48 to a sintering temperature to form the 3D part 50.

Figure 3G:
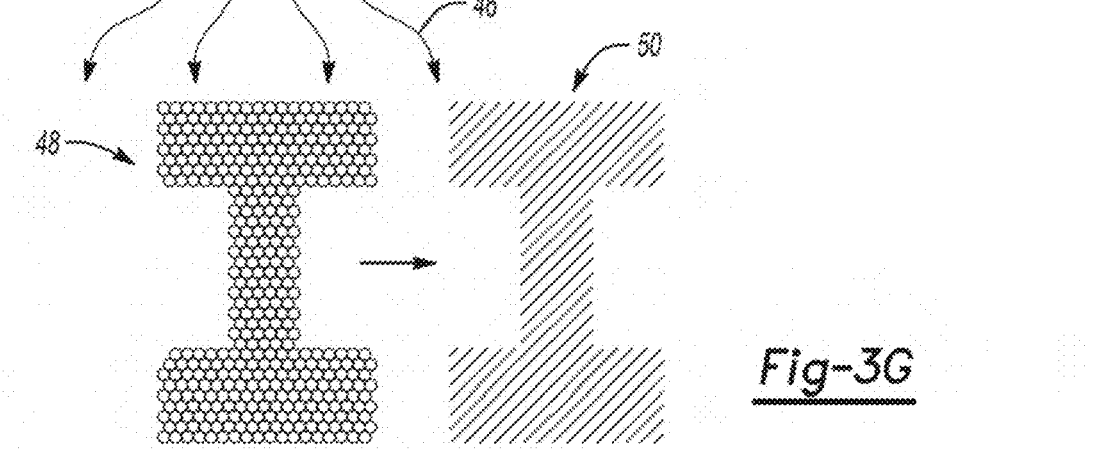

Heating to de-bind and heating to sinter take place at two different temperatures, where the temperature for de-binding is lower than the temperature for sintering. Both the de-binding and the sintering heating stages are generally depicted in FIG. 3G, where heat or radiation to generate heat may be applied as denoted by the arrows 46 from the heat source 32.

Heating to de-bind is accomplished at a thermal decomposition temperature, i.e., a temperature that is sufficient to thermally decompose the binder. As such, the temperature for de-binding depends upon the material of the binder particles of the binder fluid 36. In an example, the thermal decomposition temperature ranges from about 250° C. to about 600° C. In another example, the thermal decomposition temperature ranges from about 280° C. to about 600° C., or to about 500° C. The binder may have a clean thermal decomposition mechanism (e.g., leaves <5 wt % solid residue of the initial binder, and in some instances <1 wt % solid residue of the initial binder). The smaller residue percentage (e.g., dose to 0%) is more desirable. During the de-binding stage, the binder may decompose first intro shorter molecular fragments, which turn into a liquid phase of lower viscosity or the binder may decompose into the liquid phase of lower viscosity. Capillary pressure developing during evaporation of this liquid pulls the build material particles 16 together leading to further densification and formation of the at least substantially binder-free part 48.

While not being bound to any theory, it is believed that the at least substantially binder-free part 48 may maintain its shape due, for example, to one or more of i) the low amount of stress experience by the at least substantially binder-free part 48 due to it not being physically handled, ii) low level necking occurring between the build material particles 16 at the thermal decomposition temperature of the binder particles, and/or iii) capillary forces pushing the build material particles 16 together generated by the removal of the binder. The at least substantially binder-free part 48 may maintain its shape although the binder is at least substantially removed and the build material particles 16 are not yet sintered. Heating to form the substantially binder-free part 48 may begin the initial stages of sintering, which can result in the formation of weak bonds that are strengthened during final sintering.

Heating to sinter is accomplished at a sintering temperature, i.e., a temperature that is sufficient to sinter the remaining build material particles 16. The sintering temperature is highly depending upon the composition of the build material particles 16. When the metallic build material 16 is used, the at least substantially binder-free part 48 may be heated, during sintering, to a temperature ranging from about 80% to about 99.9% of the melting point or the solidus, eutectic, or peritectic temperature of the metallic build material 16. In another example, the at least substantially binder-free part 48 may be heated to a temperature ranging from about 90% to about 95% of the melting point or the solidus, eutectic, or peritectic temperature of the metallic build material 16. In still another example, the at least substantially binder-free part 48 may be heated to a temperature ranging from about 60% to about 85% of the melting point or the solidus, eutectic, or peritectic temperature of the metallic build material 16. When the ceramic build material 16 is used or when the composite build material 16 is used, the at least substantially binder-free part 48 may be heated, during sintering, to a temperature ranging from about 40% to about 90% of the melting temperature of the build material particles 16. In another example, the at least substantially binder-free part 48 may be heated to a temperature ranging from about 50% to about 80% of the melting temperature of the build material particles 16.

The sintering heating temperature may also depend upon the particle size and time for sintering (i.e., high temperature exposure time). As an example, the sintering temperature may range from about 580° C. to about 1400° C. In another example, the sintering temperature is at least 900° C. As still other examples, the sintering temperature may range from about 900 to about 2000° C., or from about 1400° C. to about 1700° C. An example of a sintering temperature for aluminum is about 605° C., an example of a sintering temperature for bronze is about 850° C., and an example of a sintering temperature for stainless steel is about 1300° C. While these temperatures are provided as sintering temperature examples, it is to be understood that the sintering heating temperature depends upon the build material 16 that is utilized, and may be higher or lower than the provided examples.

Heating at a suitable temperature sinters and fuses the build material particles 16 to form a completed 3D part 50, which may be even further densified relative to the at least substantially binder-free part 48. For example, as a result of sintering, the density may go from 50% density to over 90%, and in some cases very close to 100% of the theoretical density.

The length of time at which the heat 46 (for each of de-binding and sintering) is applied and the rate at which the part 42', 48 is heated may be dependent, for example, on one or more of: characteristics of the heat or radiation source 32, characteristics of the binder particles, characteristics of the build material 16 (e.g., type, particle size, etc.), and/or the characteristics of the 3D part 50 (e.g., wall thickness).

The cured intermediate part 42' may be heated at the thermal decomposition temperature for a thermal decomposition time period ranging from about 10 minutes to about 72 hours. The cured intermediate part 42' may be heated to the thermal decomposition temperature at a rate ranging from about 0.5° C./minute to about 20° C./minute. The heating rate may depend, in part, on one or more of: the amount of the binder in the cured intermediate part 42', the porosity of the cured intermediate part 42', and/or the characteristics of the cured intermediate part 42'/3D part 50 (e.g., size, wall thickness, etc.).

The at least substantially binder-free part 48 may be heated at the sintering temperature for a sintering time period ranging from about 20 minutes to about 15 hours. The at least substantially binder-free part 48 may be heated to the sintering temperature at a rate ranging from about 1° C./minute to about 20° C./minute. A high ramp rate up to the sintering temperature may be desirable to produce a more favorable grain structure or microstructure. However, in some instances, slower ramp rates may be desirable.

In some examples of the method 200 (such as when the build material 16 includes the metallic build material 16), the heat 46 (for each of de-binding and sintering) is applied in an environment containing an inert gas, a low reactivity gas, a reducing gas, or a combination thereof. In other words, the heating of the cured intermediate part 42' to the thermal decomposition temperature and the heating of the at least substantially binder-free part 48 to the sintering temperature are accomplished in an environment containing an inert gas, a low reactivity gas, a reducing gas, or a combination thereof. The de-binding may be accomplished in an environment containing an inert gas, a low reactivity gas, and/or a reducing gas so that the binder thermally decomposes rather than undergoing an alternate reaction which would fail to produce the at least substantially binder-free part 48 and/or to prevent the oxidation of the build material particles 16. The sintering may be accomplished in an environment containing an inert gas, a low reactivity gas, and/or a reducing gas so that the build material particles 16 will sinter rather than undergoing an alternate reaction (e.g., an oxidation reaction) which would fail to produce the 3D part 50. Examples of inert gas include argon gas, helium gas, etc. An example of a low reactivity gas includes nitrogen gas, and examples of reducing gases include hydrogen gas, carbon monoxide gas, etc.

In other examples of the method 200 (such as when the build material 16 includes the metallic build material 16), the heat 46 for each of de-binding (i.e., heating of the cured intermediate part 42' to the thermal decomposition temperature) and sintering (i.e., heating of the at least substantially binder-free part 48 to the sintering temperature)) may be applied in an environment containing carbon in addition to an inert gas, a low reactivity gas, a reducing gas, or a combination thereof. The de-binding and the sintering may be accomplished in an environment containing carbon to reduce the partial pressure of oxygen in the environment and further prevent the oxidation of the build material particles 16 during de-binding and sintering. An example of the carbon that may be placed in the heating environment includes graphite rods. In other examples, a graphite furnace may be used.

In still other examples of the method 200 (such as when the build material 16 includes the metallic build material 16), the heat 46 (for each of de-binding and sintering) is applied in a low gas pressure or vacuum environment. The de-binding and the sintering may be accomplished in a low gas pressure or vacuum environment so that the binder thermally decomposes and/or to prevent the oxidation of the build material particles 16. Moreover, sintering at the low gas pressure or under vacuum may allow for more complete or faster pore collapse, and thus higher density parts. However, vacuum may not be used during sintering when the build material particles 16 (e.g., Cr) are capable of evaporating in such conditions. In an example, the low pressure environment is at a pressure ranging from about 1E-5 torr ($1*10^{-5}$ torr) to about 10 torr.

In one example, the method 200 for three-dimensional (3D) printing, comprises: applying a metallic build material 16; patterning at least a portion 38 of the metallic build material 16 based on a 3D object model, the patterning involving: selectively applying a wetting amount of a binder fluid 36 on the at least the portion 38 of the metallic build material 16; and subsequently selectively applying a remaining amount of the binder fluid 36 on the at least the portion 38 of the metallic build material 16; wherein the area density in gsm of the wetting amount ranges from about 2 times less to about 30 times less than the area density in gsm of the remaining amount; repeating the applying of the metallic build material 16 and the pattering to create a patterned intermediate part 42; and activating a binder of the binder fluid 36 to form a cured intermediate part 42'. These examples of the method 200 may further include heating the cured intermediate part 42' to a thermal decomposition temperature of the binder to create an at least substantially binder-free part 48; and heating the at least substantially binder-free part 48 to a sintering temperature to form the 3D part 50.

Referring now to FIGS. 4A-4F, another example of the 3D printing method 300 is depicted. In the method 300, the binder fluid 36 includes the active material to absorb radiation 52 and fuse the patterned portion 38 of the build material 16 to form a fused layer 54.

Prior to execution of the method 300 or as part of the method 300, the microprocessor 28 may access data stored in the data store 30 pertaining to a 3D part 50 that is to be printed. The microprocessor 28 may determine the number of layers of build material 16 that are to be formed, the locations at which binder fluid 36 (in the wetting amount and then in the remaining amount) from the inkjet applicator 24 is to be deposited on each of the respective layers, the wetting amount of the binder fluid 36, and the remaining amount of the binder fluid 36.

Briefly, the 3D printing method 300 includes: applying the build material 16; and patterning at least a portion 38 of the build material 16 by: selectively applying the wetting amount of the binder fluid 36 on the at least the portion 38 of the build material 16; and subsequently selectively applying the remaining amount of the binder fluid 36 on the at least the portion 38 of the build material 16; wherein the area density in gsm of the wetting amount ranges from about 2 times less to about 30 times less than the area density in gsm of the remaining amount; and exposing the build material 16, including the patterned portion 38, to radiation 52, thereby fusing the patterned portion 38 to form a layer 54 of a 3D part 50. In the method 300, layers of the build material 16 are repeatedly applied, patterned with the binder fluid 36, and exposed to radiation 52 to iteratively build up the final 3D printed part 50.

As shown in FIGS. 4A and 4B, the method 300 includes applying the build material 16. The build material 16, and the positioning and spreading thereof, may be applied as described above.

Prior to further processing, the layer 34 of the build material particles 16 may be exposed to heating. Heating may be performed to pre-heat the build material particles 16, and thus the heating temperature may be below the melting point or softening point of the build material particles 16. As such, the temperature selected will depend upon the build material particles 16 that are used. As examples, the pre-heating temperature may be from about 5° C. to about 50° C. below the melting point or softening point of the build material particles 16. In an example, the pre-heating temperature ranges from about 50° C. to about 250° C. In another example, the pre-heating temperature ranges from about 150° C. to about 170° C.

Pre-heating the layer 34 of the build material particles 16 may be accomplished using any suitable heat source that exposes all of the build material particles 16 on the build material surface 12 to the heat. Examples of the heat source include a thermal heat source (e.g., a heater (not shown) integrated into the platform 12) or the radiation source 32', 32".

Referring now to FIGS. 4C and 4D, the method 300 continues by patterning at least a portion 38 of the build material 16 by: selectively applying the wetting amount of the binder fluid 36 on the at least the portion 38 of the build material 16 (FIG. 4C); and subsequently selectively applying the remaining amount of the binder fluid 36 on the at least the portion 38 of the build material 16 (FIG. 4D); wherein the area density in gsm of the wetting amount ranges from about 2 times less to about 30 times less than the area density in gsm of the remaining amount.

In the method 300, the binder fluid 36 includes the active material and a liquid vehicle. In some instances, the binder fluid 36 consists of the active material and the liquid vehicle, without any other components.

The active material may be any infrared light absorbing colorant. In an example, the active material is a near-infrared light absorber. Any near-infrared colorants, e.g., those produced by Fabricolor, Eastman Kodak, or Yamamoto, may be used in the binder fluid 36. As one example, the binder fluid 36 may be a printing liquid formulation including carbon black as the active material. Examples of this printing liquid formulation are commercially known as CM997A, 516458, C18928, C93848, C93808, or the like, all of which are available from HP Inc. Other suitable active materials include near-infrared absorbing dyes or plasmonic resonance absorbers.

As another example, the binder fluid 36 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water soluble near-infrared absorbing dyes selected from the group consisting of:

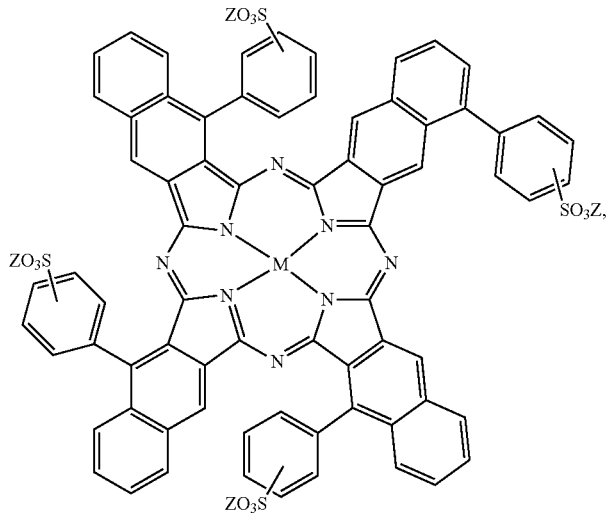

-continued
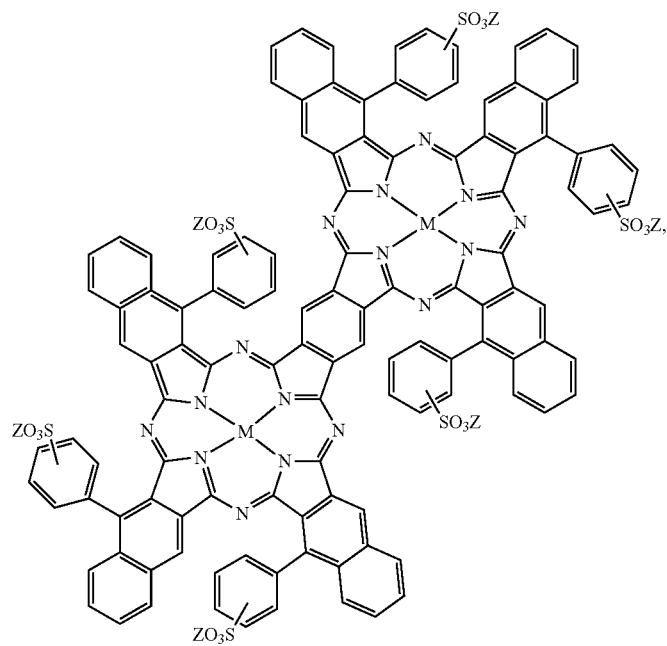
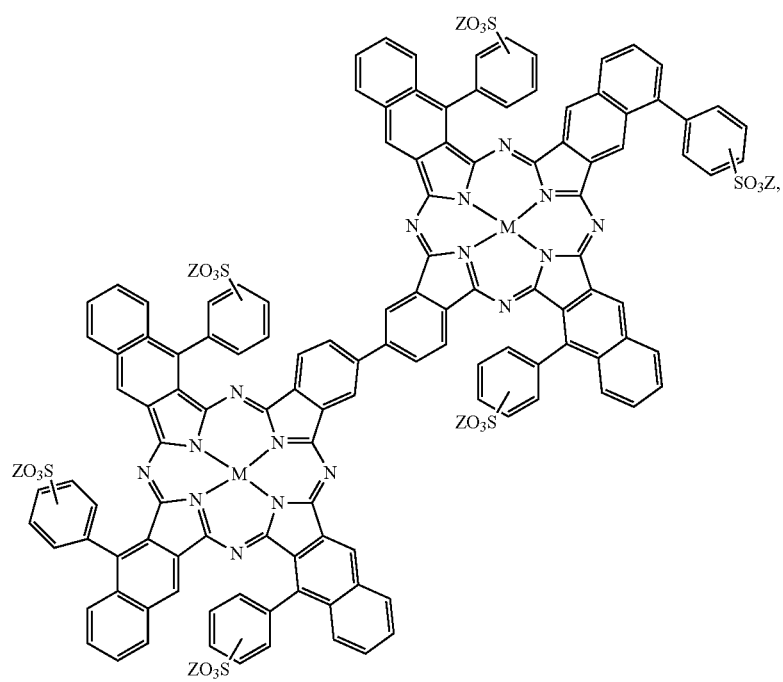

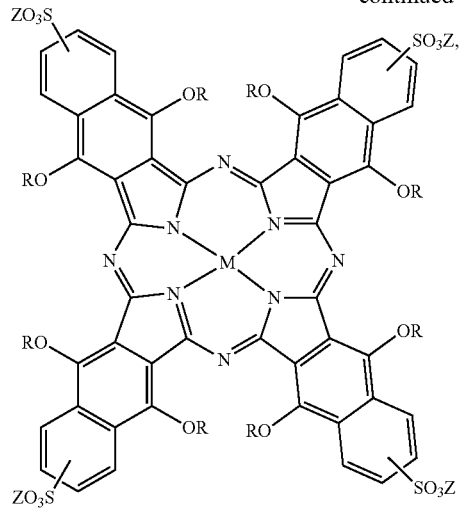

and mixtures thereof. In the above formulations, M can be a divalent metal atom (e.g., copper, etc.) or can have OSO$_3$Na axial groups filling any unfilled valencies if the metal is more than divalent (e.g., indium, etc.), R can be any C1-C8 alkyl group (including substituted alkyl and unsubstituted alkyl), and Z can be a counterion such that the overall charge of the near-infrared absorbing dye is neutral. For example, the counterion can be sodium, lithium, potassium, NH$_4^+$, etc.

Some other examples of the near-infrared absorbing dye are hydrophobic near-infrared absorbing dyes selected from the group consisting of:

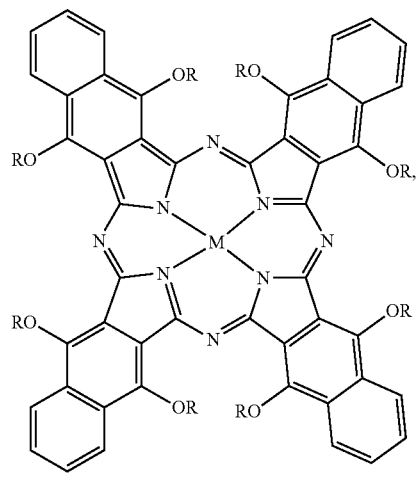

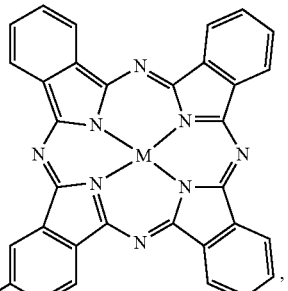

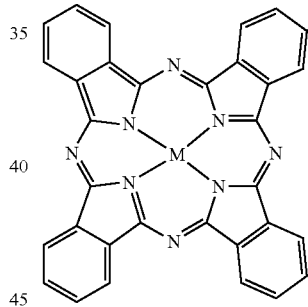

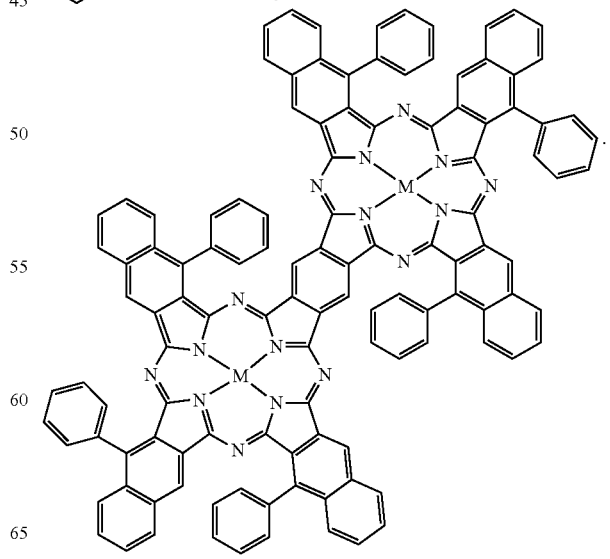

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be any C1-C8 alkyl group (including substituted alkyl and unsubstituted alkyl).

In other examples, the active material may be a plasmonic resonance absorber. The plasmonic resonance absorber allows the binder fluid 36 to absorb radiation 52 at wavelengths ranging from 800 nm to 4000 nm (e.g., at least 80% of radiation having wavelengths ranging from 800 nm to 4000 nm is absorbed), which enables the binder fluid 36 to convert enough radiation 52 to thermal energy so that the build material particles 16 fuse. The plasmonic resonance absorber also allows the binder fluid 36 to have transparency at wavelengths ranging from 400 nm to 780 nm (e.g., 20% or less of radiation having wavelengths ranging from 400 nm to 780 nm is absorbed), which enables the 3D part 50 to be white or slightly colored.

The absorption of the plasmonic resonance absorber is the result of the plasmonic resonance effects. Electrons associated with the atoms of the plasmonic resonance absorber may be collectively excited by radiation 52, which results in collective oscillation of the electrons. The wavelengths required to excite and oscillate these electrons collectively are dependent on the number of electrons present in the plasmonic resonance absorber particles, which in turn is dependent on the size of the plasmonic resonance absorber particles. The amount of energy required to collectively oscillate the particle's electrons is low enough that very small particles (e.g., 1-100 nm) may absorb radiation 52 with wavelengths several times (e.g., from 8 to 800 or more times) the size of the particles. The use of these particles allows the binder fluid 36 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO_4$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the active material that is present in the binder fluid 36 ranges from greater than 0 wt % to about 40 wt % based on the total weight of the binder fluid 36. In other examples, the amount of the active material in the binder fluid 36 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the binder fluid 36 having jetting reliability and heat and/or radiation absorbance efficiency.

As mentioned above, the binder fluid 36 also includes the liquid vehicle. The liquid vehicle when the binder fluid 36 includes the active material may be as described above in reference to the method 200. The liquid vehicle may include any of the previously described solvent(s), co-solvent(s), surfactant(s), antimicrobial agent(s), anti-kogation agent(s), and/or sequestering agent(s) in any of the previously described amounts.

Additionally, when the active material is the plasmonic resonance absorber, the plasmonic resonance absorber may, in some instances, be dispersed with a dispersant. As such, the dispersant helps to uniformly distribute the plasmonic resonance absorber throughout the binder fluid 36. Examples of suitable dispersants include polymer or small molecule dispersants, charged groups attached to the plasmonic resonance absorber surface, or other suitable dispersants. Some specific examples of suitable dispersants include a water soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the binder fluid 36 may range from about 10 wt % to about 200 wt % based on the weight of the plasmonic resonance absorber in the binder fluid 36.

When the active material is the plasmonic resonance absorber, a silane coupling agent may also be added to the binder fluid 36 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the binder fluid 36 may range from about 0.1 wt % to about 50 wt % based on the weight of the plasmonic resonance absorber in the binder fluid 36. In an example, the total amount of silane coupling agent(s) in the binder fluid 36 ranges from about 1 wt % to about 30 wt % based on the weight of the plasmonic resonance absorber. In another example, the total amount of silane coupling agent(s) in the binder fluid 36 ranges from about 2.5 wt % to about 25 wt % based on the weight of the plasmonic resonance absorber.

The portion 38 may be patterned with the binder fluid 36, in the wetting amount and then in the remaining amount, as described above. Additionally, the microprocessor 28 may process data, and in response, control the inkjet applicator 24 (e.g., in the directions indicated by the arrow 26) to deposit the binder fluid 36 (in the wetting amount and then in the remaining amount) onto predetermined portion(s) 38 of the build material 16 that are to become part of the 3D part 50. The inkjet applicator 24 may be programmed to receive commands from the microprocessor 28 and to deposit the binder fluid 36 (in the wetting amount and then in the remaining amount) according to a pattern of a cross-section for the layer of the 3D part that is to be formed.

In the example shown in FIGS. 4C and 4D, the inkjet applicator 24 selectively applies the binder fluid 36 (in the wetting amount and then in the remaining amount) on those portion(s) 38 of the layer 34 that is/are to become the first layer of the 3D part 50. As an example, if the 3D part that is to be formed is to be shaped like a cube or cylinder, the binder fluid 36 (in the wetting amount and then in the remaining amount) will be deposited in a square pattern or a circular pattern (from a top view), respectively, on at least a portion of the layer 34 of the build material particles 16. In the example shown in FIGS. 4C and 4D, the binder fluid 36 (in the wetting amount and then in the remaining amount) is deposited in a square pattern on the portion 38 of the layer 34 and not on the portions 40.

The total volume (i.e., the wetting amount plus the remaining amount) of the binder fluid 36 that is applied per unit of the build material 16 in the patterned portion 38 may be sufficient to absorb and convert enough radiation 52 so that the build material 16 in the patterned portion 38 will fuse. The volume of the binder fluid 36 that is applied per unit of the build material 16 may depend, at least in part, on the active material used, the active material loading in the binder fluid 36, and the build material 16 used.

It is to be understood that a single binder fluid 36 may be used to pattern the portion 38, or multiple binder fluids 36 may be used to pattern the portion 38. When multiple binder fluids 36 are utilized, each is capable of absorbing enough radiation 52 so that the build material 16 in the patterned portion 38 will fuse.

Figure 4E:
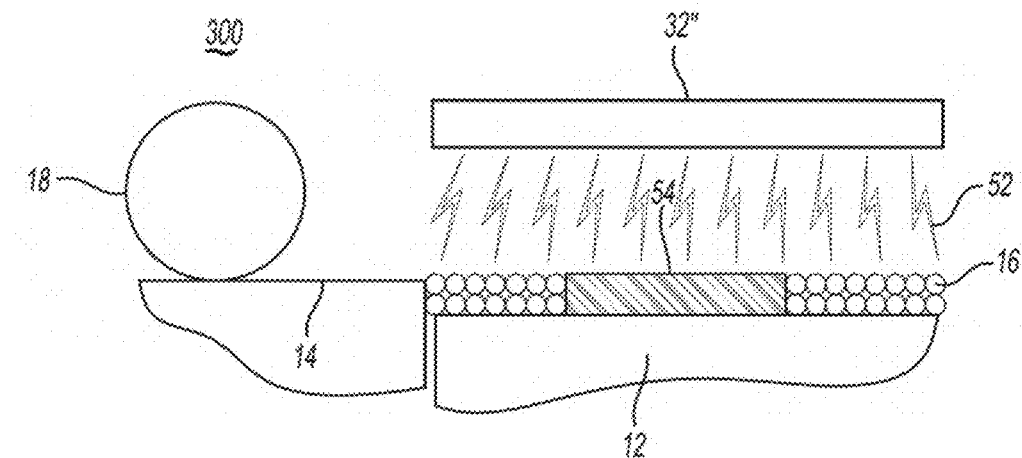

As shown in FIGS. 4D and 4E, the method 300 further comprises exposing the build material 16, including the patterned portion 38, to radiation 52 to fuse the patterned portion 38 to form a layer 54. The radiation 52 may be applied with the source 32' of radiation 52 as shown in FIG. 4D or with the source 32" of radiation 52 as shown in FIG. 4E.

The active material in the binder fluid 36 enhances the absorption of the radiation 52, converts the absorbed radiation 52 to thermal energy, and promotes the transfer of the thermal heat to the build material particles 16 in contact therewith. In an example, the binder fluid 36 sufficiently elevates the temperature of the build material particles 16 in layer 34 above the melting or softening point of the particles 16, allowing fusing (e.g., sintering, binding, curing, etc.) of the build material particles 16 to take place. The application of the radiation 52 forms the fused layer 54, as shown in FIG. 4E.

It is to be understood that portions 40 of the build material 16 that do not have the binder fluid 36 applied thereto do not absorb enough radiation 52 to fuse. As such, these portions 40 do not become part of the 3D part 50 that is ultimately formed. The build material 16 in portions 40 may be reclaimed to be reused as build material in the printing of another 3D part.

Figure 4F:
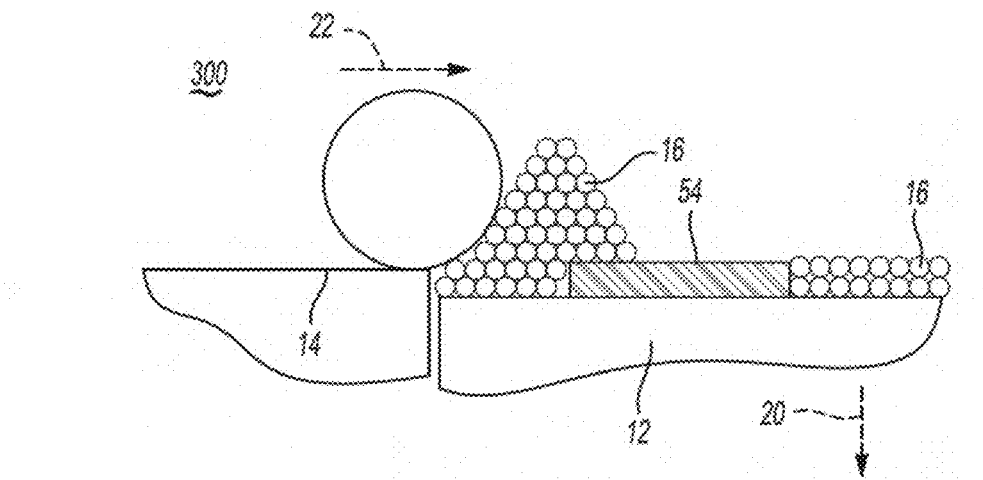

The processes shown in FIGS. 4A-4E may be repeated to iteratively build up several fused layers and to form the 3D printed part 50. FIG. 4F illustrates the initial formation of a second layer of build material particles 16 on the previously formed layer 54. In FIG. 4F, following the fusing of the predetermined portion(s) 38 of the layer 34 of build material 16, the microprocessor 28 may process data, and in response cause the build area platform 12 to be moved a relatively small distance in the direction denoted by the arrow 20. In other words, the build area platform 12 may be lowered to enable the next layer of build material particles 16 to be formed. For example, the build material platform 12 may be lowered a distance that is equivalent to the height of the layer 34. In addition, following the lowering of the build area platform 12, the controller 28 may control the build material supply 14 to supply additional build material particles 16 (e.g., through operation of an elevator, an auger, or the like) and the build material distributor 18 to form another layer of build material particles 16 on top of the previously formed layer 54 with the additional build material 16. The newly formed layer may be in some instances pre-heated, patterned with the binder fluid 36 (in the wetting amount and then in the remaining amount), and then exposed to radiation 52 from the source 32', 32" of radiation 52 to form the additional fused layer. [0212] in the examples of the method disclosed herein, the 3D part 50 may be exposed to a process that removes unbound or non-bound build material 16 from the part 50. Examples of these processes include brushing, exposure to an air jet, water spray, etc.

Figure 5:
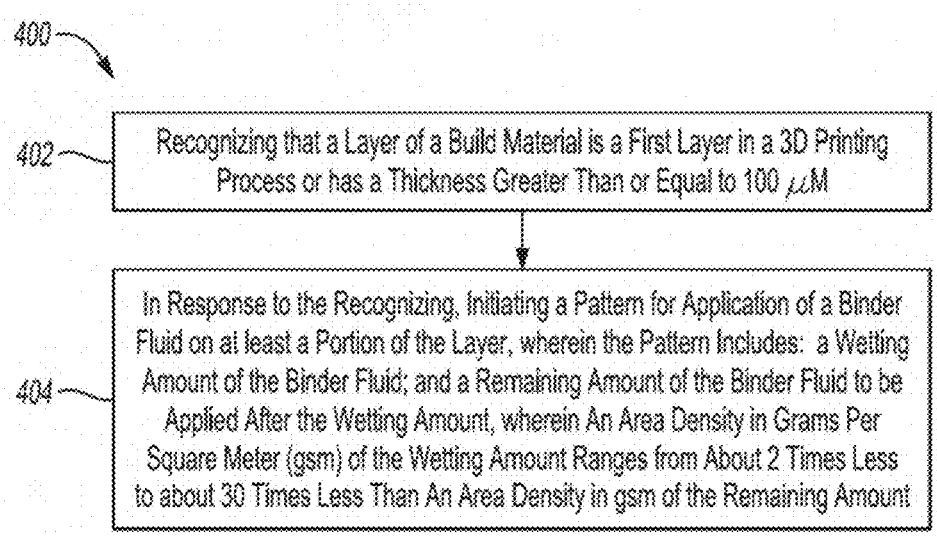
FIG. 5 is a flow diagram illustrating an example of another method disclosed herein.

Referring now to FIG. 5, another method 400 is depicted. An example of the method 400 comprises: recognizing that a layer 34 of a build material 16 is a first layer in a 3D printing process 100, 200, 300 or has a thickness greater than or equal to 100 µm (reference numeral 402); and in response to the recognizing, initiating a pattern for application of a binder fluid 36 on at least a portion 38 of the layer 34, wherein the pattern includes: a wetting amount of the binder fluid 36; and a remaining amount of the binder fluid 36 to be applied after the wetting amount, wherein the area density in gsm of the wetting amount ranges from about 2 times less to about 30 times less than the area density in gsm of the remaining amount (reference numeral 404).

The printer 10 may be programmed to perform the method 400, and may perform the recognizing by receiving input or data related to a particular 3D print job, and then may select an appropriate pattern for applying the binder fluid 34 according to the examples disclosed herein. It is to be understood that the layer 34, the build material 16, the binder fluid 36, the wetting amount, the remaining amount, etc. may all be as described in reference to FIG. 1, FIG. 2, FIGS. 3A-3G, and FIGS. 4A-4F.

In some examples, the method 400 may also include recognizing and/or receiving information related to the build material 16 and/or the binder fluid 36. As previously discussed, the information related to the build material 16 and/or the binder fluid 36 may include the composition of the build material 16, the composition of the binder fluid 36, the surface tension of the binder fluid 36, or a combination thereof.

In some examples, the method 400 may also include identifying a number of print passes over which to apply the remaining amount; and identifying sub-amounts of the remaining amount to apply during each of the print passes.

In other examples, the method 400 may also include identifying that the wetting amount and the remaining amount should be applied in a single print pass using separate inkjet printheads that are spatially separated from one another.

To further illustrate the present disclosure, examples are given herein. It is to be understood these examples are provided for illustrative purposes and are not to be construed as limiting the scope of the present disclosure.

EXAMPLES

Example 1

An example of the binder fluid was prepared. The example binder fluid included an acrylic binder latex dispersion as the binder. The general formulation of the example binder fluid is shown in Table 1, with the wt % of each component that was used. The weight percentage of the acrylic binder latex dispersion represents the % actives, i.e., the total acrylic binder latex solids present in the final formulation, and does not account for any fluid that may be in the latex dispersion.

TABLE 1

| Ingredient | Specific component | Example binder fluid (wt %) |
|---|---|---|
| Coalescing solvents | 2-methyl-1,3-propanediol | 9.00 |
|  | 2-pyrrolidinone | 16.00 |
| Surfactants | TERGITOL ™ 15-S-7 | 1.00 |
|  | CAPSTONE ® FS-35 | 1.98 |
| Polymer particles | Acrylic binder latex dispersion | 38.65 |
| Water |  | Balance |

An HP 792 inkjet printhead and an inkjet printing stage were used to pattern layers of stainless steel (316L) alloy powder. The stainless steel powder (available from Additive Metal Alloys as 316L cl F −22 μm) had a D50 particle size distribution of about 15 μm (i.e., the median of the particle size distribution, where half the population is above 15 μm and half is below 15 μm). Each layer of the stainless steel powder was about 500 μm thick.

One comparative example pattern was printed, and three example patterns (referred to as "example pattern 1," "example pattern 2," and "example pattern 3") were printed. The same total binder fluid flux density (about 37.9 gsm) was used in each pattern. The comparative example pattern consisted of a single print pass at the ~37.9 gsm jetted fluid flux. Example pattern 1 consisted of eight print passes, each at ~4.74 gsm jetted fluid flux (i.e., wetting amount≈4.74 gsm, remaining amount≈33.16 deposited in equal fluxes over 7 print passes). Example pattern 2 consisted of a first print pass at ~4.74 gsm jetted fluid flux (the wetting amount) and a second print pass at ~33.16 gsm jetted fluid flux (the remaining amount). Example pattern 3 consisted of a first print pass at ~4.74 gsm jetted fluid flux (the wetting amount), and three additional printing passes over which the remaining amount (~33.16) was applied. In Example pattern 3, the remaining amount was applied in a first print pass at ~7.1 gsm jetted fluid flux, a second print pass at ~7.1 gsm jetted fluid flux, and a third and final print pass at ~19 gsm jetted fluid flux.

Figure 6:
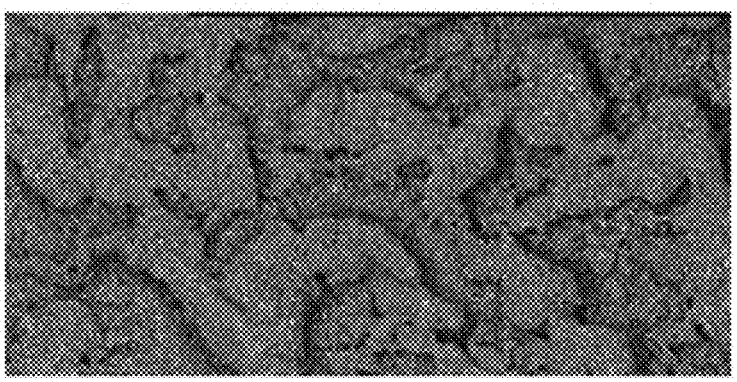
FIG. 6 shows a black and white version of an optical microscopy photo at 100× magnification of a layer of build material powder after being patterned according to a comparative method.

FIG. 6 shows an optical microscopy photo at 100× magnification of the layer of the stainless steel powder after the example binder fluid was jetted thereon according to the comparative example pattern. FIG. 6 was obtained on a Keyence VHX-5000 digital microscope. As shown in FIG. 6, the comparative example pattern results in significant disruption of the powder surface. The 3D surface topography map (not shown) of the photo shown in FIG. 6 illustrated the rough surface resulting from particle displacement.

Figure 7:
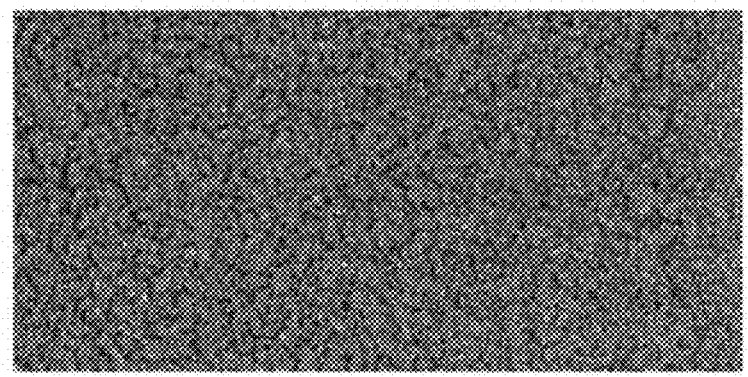
FIG. 7 shows a black and white version of an optical microscopy photo at 100× magnification of a layer of build material powder after being patterned according to an example of a method disclosed herein.
Figure 8:
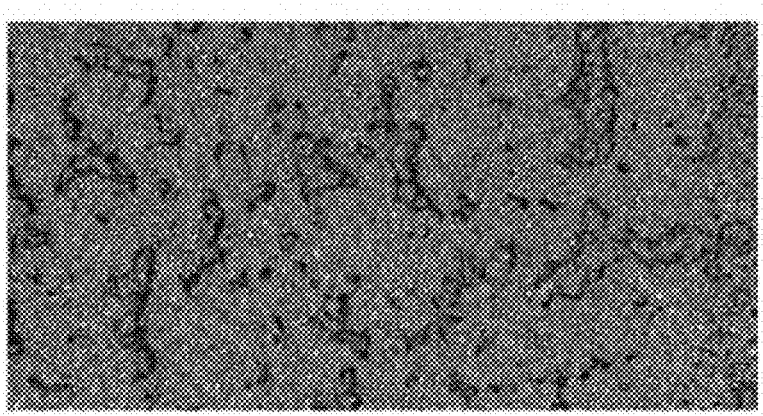
FIG. 8 shows a black and white version of an optical microscopy photo at 100× magnification of a layer of build material powder after being patterned according to another example of the method disclosed herein.
Figure 9:
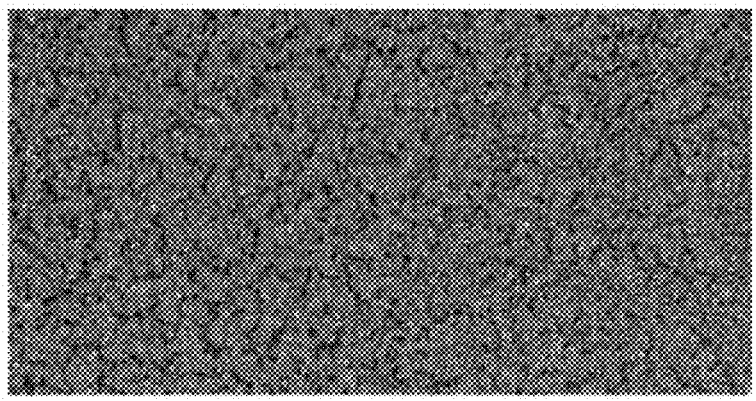
FIG. 9 shows a black and white version of an optical microscopy photo at 100× magnification of a layer of build material powder after being patterned according to another example of the method disclosed herein.

FIG. 7 shows an optical microscopy photo at 100× magnification of the layer of the stainless steel powder after the example binder fluid was jetted thereon according to example pattern 1, FIG. 8 shows an optical microscopy photo at 100× magnification of the layer of the stainless steel powder after the example binder fluid was jetted thereon according to example pattern 2, and FIG. 9 shows an optical microscopy photo at 100× magnification of the layer of the stainless steel powder after the example binder fluid was jetted thereon according to example pattern 3. FIGS. 7-9 were obtained on the Keyence VHX-5000 digital microscope. As shown in FIGS. 7-9, patterning first with a wetting amount and then with a remaining amount (optionally separated into multiple print passes) reduces the disruption of the disruption of the powder surface as compared to patterning all of the binder fluid in a single pass.

While not shown, each of the 3D surface topography maps of the photos shown in FIGS. 7-9 illustrated smoother surfaces than the comparative example.

Example pattern 1 exhibited very little surface topography disruption when compared to the comparative example. While example pattern 2 results in some surface topography disruption (e.g., when compared to example patterns 1 and 3), it was much less pronounced than the comparative example (i.e., without the wetting amount applied first). Example pattern 3 exhibited little to no surface topography disruption when compared to the comparative example, indicating that the wetting amount in combination with a stepwise application of the remaining amount may be particularly desirable for at least some applications where a substantially smooth surface topography is desirable.

Example 2

The same binder fluid described in Example 1 was used in this example.

An HP 792 inkjet printhead and an inkjet printing stage were used to pattern layers of stainless steel (316L) alloy powder. The stainless steel powder (available from Additive Metal Alloys as 316L cl F −22 μm) had a D50 particle size distribution of about 15 μm (i.e., the median of the particle size distribution, where half the population is above 15 μm and half is below 15 μm). The comparative layer of the stainless steel powder and the example layer of the stainless steel powder were each about 600 μm thick.

A comparative example pattern was printed, and one example pattern was printed. The comparative example pattern consisted of a single print pass at 100% jetted fluid flux. The example pattern consisted of nine print passes, each at ~12% jetted fluid flux (i.e., wetting amount≈12%, remaining amount≈96% deposited in equal fluxes over 8 print passes).

The average surface roughness of the comparative example patterned layer and the example patterned layer were measured via image based profilometry. The average surface roughness of the comparative example patterned layer was about 160 μm, and the average surface roughness of the example patterned layer was about 20 μm. These results indicate that using the wetting and remaining amounts to apply the binder fluid can achieve an average surface roughness reduction of about 87.5%.

It is to be understood that the ranges provided herein include the stated range and any value or sub-range within the stated range. For example, a range from about 2 times less to about 30 times less should be interpreted to include not only the explicitly recited limits of from about 2 times less to about 30 times less, but also to include individual values, such as 2.5 times less, 4.8 times less, 6.0 times less, 18.05 times less, etc., and sub-ranges, such as from about 2 times less to about 10 times less, from about 3.5 times less to about 9.5 times less, from about 2.5 times less to about 8.0 times less, etc. Furthermore, when "about", "~", or "≈" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for three-dimensional (3D) printing, comprising:
    applying a layer of build material particles comprising at least one of metallic build material particles, ceramic build material particles, metallic and polymeric build material particles, or ceramic and polymeric build material particles; and
    patterning at least a portion of the build material layer by:
        selectively applying a wetting amount of a binder fluid on said at least the portion of the build material layer; and
        subsequently selectively applying a remaining amount of the binder fluid on said at least the portion of the build material layer having the wetting amount applied thereon;
    wherein:
        a thickness of the applied build material layer is 100 microns, and the remaining amount of the binder fluid is applied in an amount ranging from about 12 gsm to about 45 gsm; or
        a thickness of the applied build material layer is 200 microns, and the remaining amount of the binder fluid is applied in an amount ranging from about 37 gsm to about 68 gsm; or
        a thickness of the applied build material layer is 500 microns, and the remaining amount of the binder fluid is applied in an amount ranging from about 45 gsm to about 252 gsm;
        and wherein an area density in grams per square meter (gsm) of the wetting amount ranges from about 2 times less to about 30 times less than an area density in gsm of the remaining amount;
    repeating the applying of the build material layer and the patterning to form a 3D part.

2. The method as defined in claim 1 wherein:
    the selectively applying of the wetting amount and the selectively applying of the remaining amount take place in separate print passes; and
    the selectively applying of the remaining amount of the binder fluid is accomplished in multiple print passes.

3. The method as defined in claim 1 wherein:
    the selectively applying of the wetting amount and the selectively applying of the remaining amount take place in a single print pass using separate inkjet printheads that are spatially separated from one another.

4. The method as defined in claim 1, further comprising:
    heating the 3D part.

5. The method as defined in claim 4:
    heating the 3D part to a thermal decomposition temperature of a binder included in the binder fluid; and
    heating the 3D part to a sintering temperature to form a sintered 3D part.

6. The method as defined in claim 4 wherein prior to the heating of the 3D part, the method further comprises:
    evaporating a liquid vehicle of the binder fluid to activate a binder of the binder fluid; or
    allowing the 3D part to reach an activation temperature to activate a binder of the binder fluid.

7. The method as defined in claim 1, further comprising:
    exposing the build material layer, including the patterned portion, to radiation, to fuse the patterned portion.

8. The method as defined in claim 1:
    wherein the binder fluid includes:
        a binder or an active material; and
        a liquid vehicle, wherein the liquid vehicle comprises a surfactant; and wherein the binder fluid has a surface tension of less than or equal to about 40 dyn/cm.

9. The method as defined in claim 1 wherein the thickness of the applied build material layer is 100 μm.

10. The method as defined in claim 1 wherein the patterning is performed based on a 3D object model.

11. A method for three-dimensional (3D) printing, comprising:
    applying a layer of metallic build material particles;
    patterning at least a portion of the metallic build material layer based on a 3D object model, the patterning involving:
        selectively applying a wetting amount of a binder fluid on said at least the portion of the metallic build material layer; and
        subsequently selectively applying a remaining amount of the binder fluid on said at least the portion of the metallic build material layer having the wetting amount applied thereon; wherein:
            a thickness of the applied metallic build material layer is 100 microns, and the remaining amount of the binder fluid is applied in an amount ranging from about 12 gsm to about 45 gsm; or
            a thickness of the applied metallic build material layer is 200 microns, and the remaining amount of the binder fluid is applied in an amount ranging from about 37 gsm to about 68 gsm; or
            a thickness of the applied metallic build material layer is 500 microns, and the remaining amount of the binder fluid is applied in an amount ranging from about 45 gsm to about 252 gsm;
            and wherein an area density in grams per square meter (gsm) of the wetting amount ranges from about 2 times less to about 30 times less than an area density in gsm of the remaining amount;

repeating the applying of the metallic build material layer and the patterning to form a patterned 3D part; and activating a binder of the binder fluid to form a cured 3D part.

12. The method as defined in claim 11, further comprising:

heating the cured 3D part to a thermal decomposition temperature of the binder; and heating to a sintering temperature to form a sintered 3D part.

13. A method for three-dimensional (3D) printing, comprising:

applying a layer of build material particles comprising at least one of metallic build material particles, ceramic build material particles, metallic and polymeric build material particles, or ceramic and polymeric build material particles; and patterning at least a portion of the build material layer by:

selectively applying a wetting amount of a binder fluid on said at least the portion of the build material layer; and subsequently selectively applying a remaining amount of the binder fluid on said at least the portion of the build material layer having the wetting amount applied thereon:

wherein a thickness of the applied build material layer is 100 microns, the wetting amount of the binder fluid is applied in an amount ranging from about 1.5 gsm to about 8.5 gsm, and the remaining amount of the binder fluid is applied in an amount ranging about 12 gsm to about 42 gsm;

and wherein an area density in grams per square meter (gsm) of the wetting amount ranges from about 2 times less to about 30 times less than an area density in gsm of the remaining amount;

repeating the applying of the build material layer and the patterning to form a 3D part.

14. The method as defined in claim 13 wherein:

the wetting amount is sufficient to wet said at least the portion of the build material layer and is insufficient to form a puddle on a surface of the build material layer within said at least the portion of the build material layer; and the remaining amount is sufficient to at least partially fill interstitial spaces in said at least the portion of the build material layer without displacing the build material particles within said at least the portion of the build material layer.

15. The method as defined in claim 13, further comprising:

heating the 3D part, wherein the heating of the 3D part includes:

heating the 3D part to a thermal decomposition temperature of a binder included in the binder fluid; and heating the 3D part to a sintering temperature to form a sintered 3D part.

16. The method of claim 13 wherein the binder fluid includes:

a binder or an active material; and a liquid vehicle, wherein the liquid vehicle comprises a surfactant;

and wherein the binder fluid has a surface tension of less than or equal to about dyn/cm.

17. A method for three-dimensional (3D) printing, comprising:

applying a layer of build material particles comprising at least one of metallic build material particles, ceramic build material particles, metallic and polymeric build material particles, or ceramic and polymeric build material particles; and patterning at least a portion of the build material layer by:

selectively applying a wetting amount of a binder fluid on said at least the portion of the build material layer; and subsequently selectively applying a remaining amount of the binder fluid on said at least the portion of the build material layer having the wetting amount applied thereon:

wherein a thickness of the applied build material layer is 500 microns to 600 microns, the wetting amount of the binder fluid is applied in an amount ranging from about 1.5 gsm to about 8.5 gsm, and the remaining amount of the binder fluid is applied in an amount ranging about 12 gsm to about 42 gsm;

and wherein an area density in grams per square meter (gsm) of the wetting amount ranges from about 2 times less to about 30 times less than an area density in gsm of the remaining amount;

repeating the applying of the build material layer and the patterning to form a 3D part.

* * * * *